(12) United States Patent
Nihad Hamed

(10) Patent No.: US 12,497,134 B1
(45) Date of Patent: Dec. 16, 2025

(54) ELECTRICAL DERAILLEUR CONTROLLER

(71) Applicant: Hazem Nihad Hamed, New Smyrna Beach, FL (US)

(72) Inventor: Hazem Nihad Hamed, New Smyrna Beach, FL (US)

(*) Notice: Subject to any disclaimer, the term of this patent is extended or adjusted under 35 U.S.C. 154(b) by 0 days.

(21) Appl. No.: 19/228,645

(22) Filed: Jun. 4, 2025

(51) Int. Cl.
| | |
|---|---|
| *B62M 25/08* | (2006.01) |
| *B62M 9/122* | (2010.01) |
| *B62M 9/132* | (2010.01) |
| *G02F 1/1333* | (2006.01) |
| *G02F 1/1339* | (2006.01) |
| *G08C 17/02* | (2006.01) |

(52) U.S. Cl.
CPC ............ *B62M 25/08* (2013.01); *B62M 9/122* (2013.01); *B62M 9/132* (2013.01); *G02F 1/133308* (2013.01); *G02F 1/1339* (2013.01); *G08C 17/02* (2013.01)

(58) Field of Classification Search
CPC ...... B62M 25/08; B62M 9/122; B62M 9/132; G02F 1/133308; G02F 1/1339; G08C 17/02
See application file for complete search history.

(56) References Cited

U.S. PATENT DOCUMENTS

| | | | |
|---|---|---|---|
| 7,874,567 B2 | 1/2011 | Ichida et al. | |
| 8,429,061 B2 | 4/2013 | Shirai | |
| 8,458,080 B2 | 6/2013 | Shirai | |
| 8,655,548 B2 | 2/2014 | Ichida et al. | |
| 9,026,053 B2 | 5/2015 | Molettiere et al. | |
| 9,229,712 B2 | 1/2016 | Takamoto et al. | |
| 9,491,788 B1 | 11/2016 | Kasai et al. | |
| 10,370,056 B2 | 8/2019 | Komatsu et al. | |
| 10,640,171 B2 | 5/2020 | Hamed | |
| 11,046,390 B2 | 6/2021 | Hamed | |
| 11,077,968 B2 | 8/2021 | Hamed | |
| 11,345,441 B2 | 5/2022 | Hamed | |
| 11,440,621 B2* | 9/2022 | Komatsu | B62J 45/20 |
| 11,479,323 B2 | 10/2022 | Hamed | |
| 11,565,766 B2 | 1/2023 | Kosaka | |
| 11,566,702 B2* | 1/2023 | Chuang | F16H 61/0213 |
| 11,767,082 B2 | 9/2023 | Hamed | |
| 11,787,504 B2 | 10/2023 | Hamed | |
| 11,794,856 B2 | 10/2023 | Hamed | |
| 12,060,129 B2 | 8/2024 | Garnica | |
| 12,240,562 B2 | 3/2025 | Shiun Kehong et al. | |
| 12,365,421 B1* | 7/2025 | Hamed | B62L 3/023 |
| 2019/0031290 A1* | 1/2019 | Kurokawa | B62K 19/36 |

(Continued)

*Primary Examiner* — Richard M Camby

(57) ABSTRACT

A bicycle electrical derailleur controller making use of a wireless two way communication protocol to receive actuation commands for a front and rear derailleurs from an operator user interface such as a cellphone and including a power pack to accordingly actuate each of controlled front and rear derailleur through two discrete wired connections, and further including an input for a cadence sensor, integral and therefore environmentally protected inertial and environmental sensing modules with gyroscopic, acceleration, temperature, humidity and pressure readings thereof being wirelessly transmitted to controlling operator user interface along with reading of thereto wired cadence sensor on regular and programmable intervals and further including an LCD display to relay controller status along with other operational parameters to a rider.

22 Claims, 16 Drawing Sheets

(56) References Cited

U.S. PATENT DOCUMENTS

2021/0155315 A1\* 5/2021 Hahn ................... G09G 5/37
2023/0227123 A1\* 7/2023 Shipman ............ B62M 9/122
                                                    474/80

\* cited by examiner

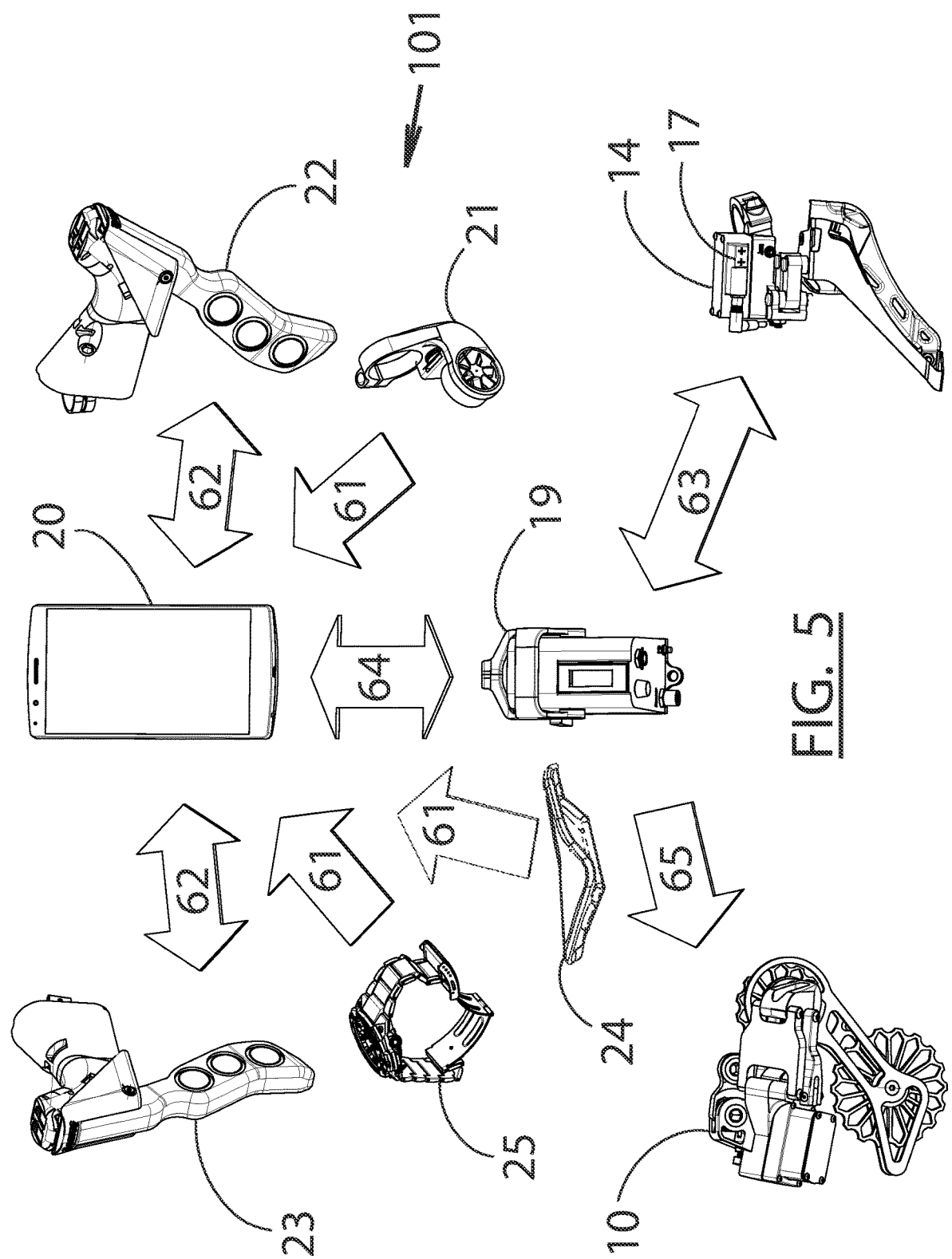

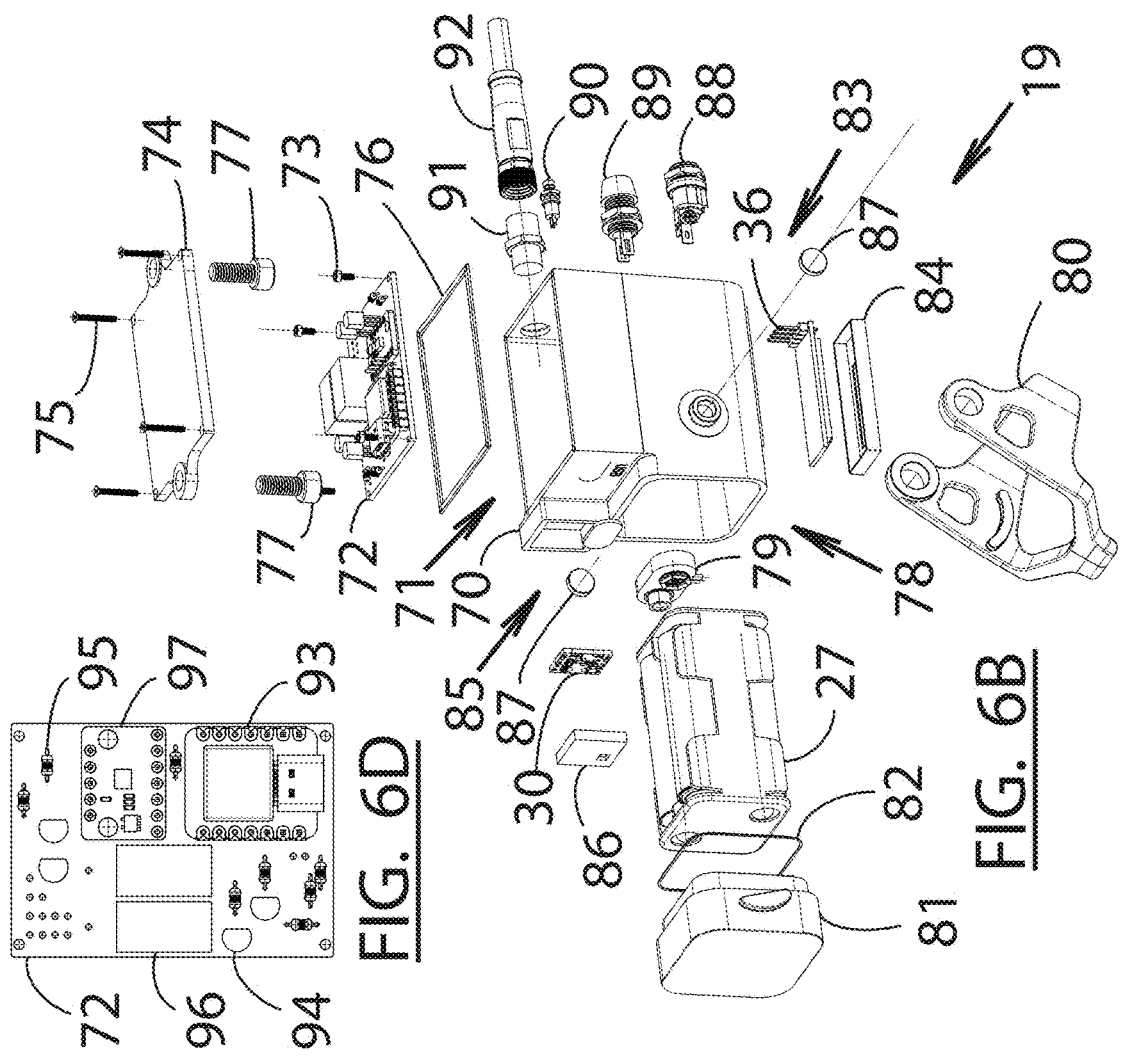
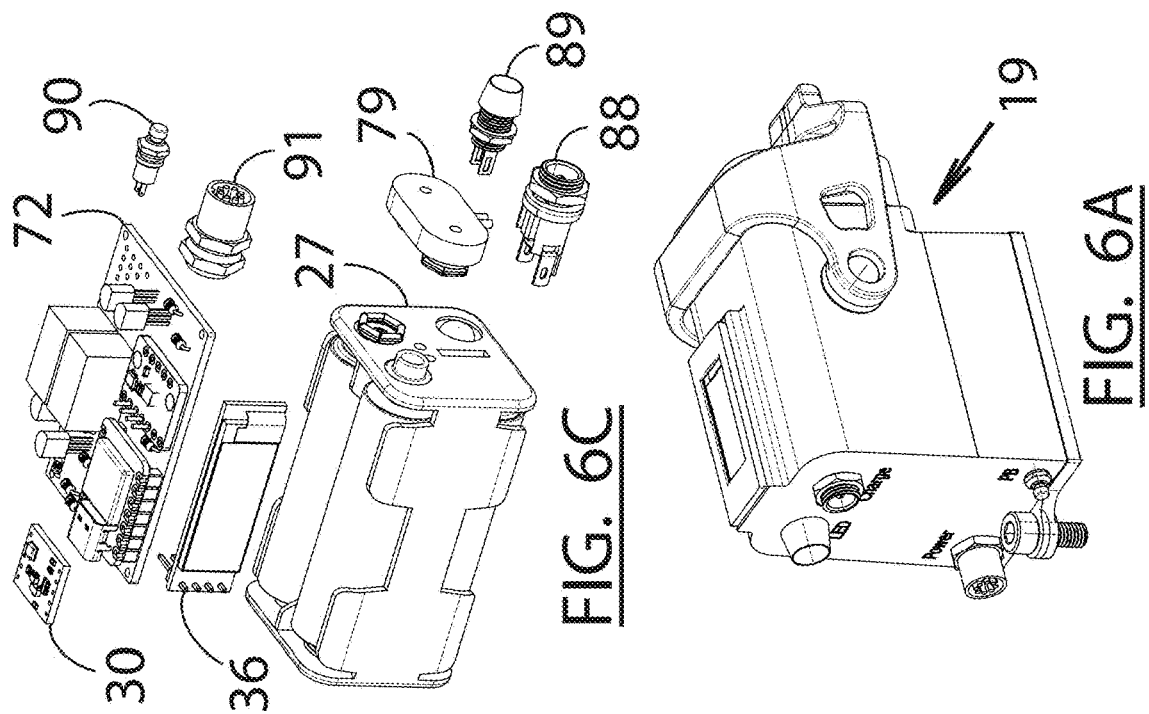

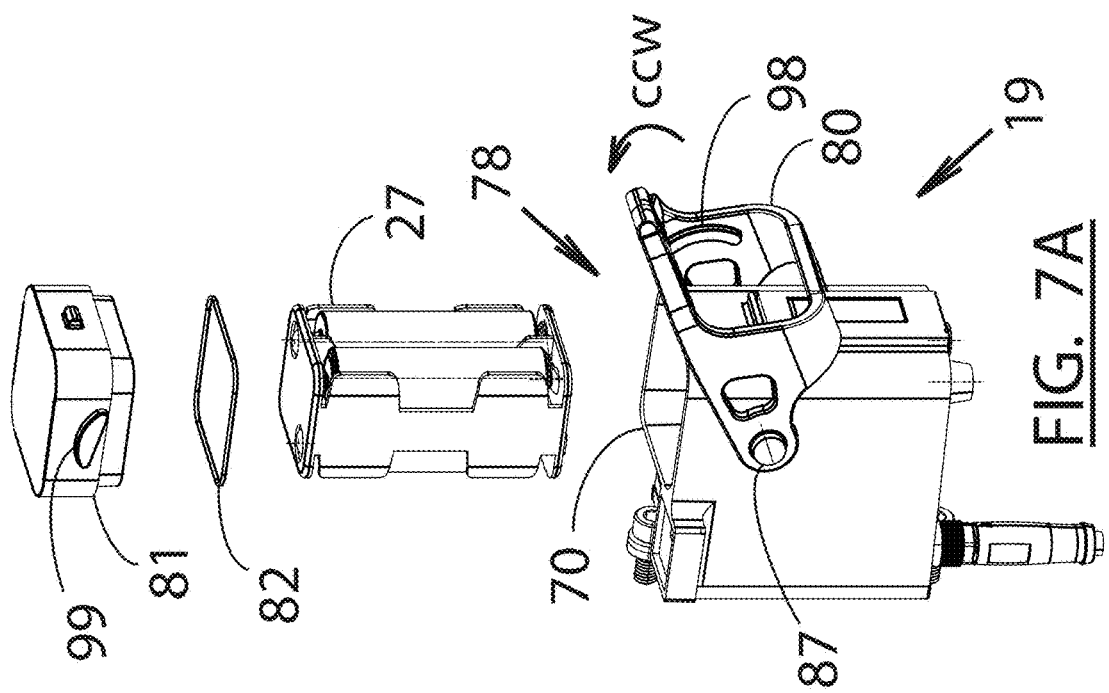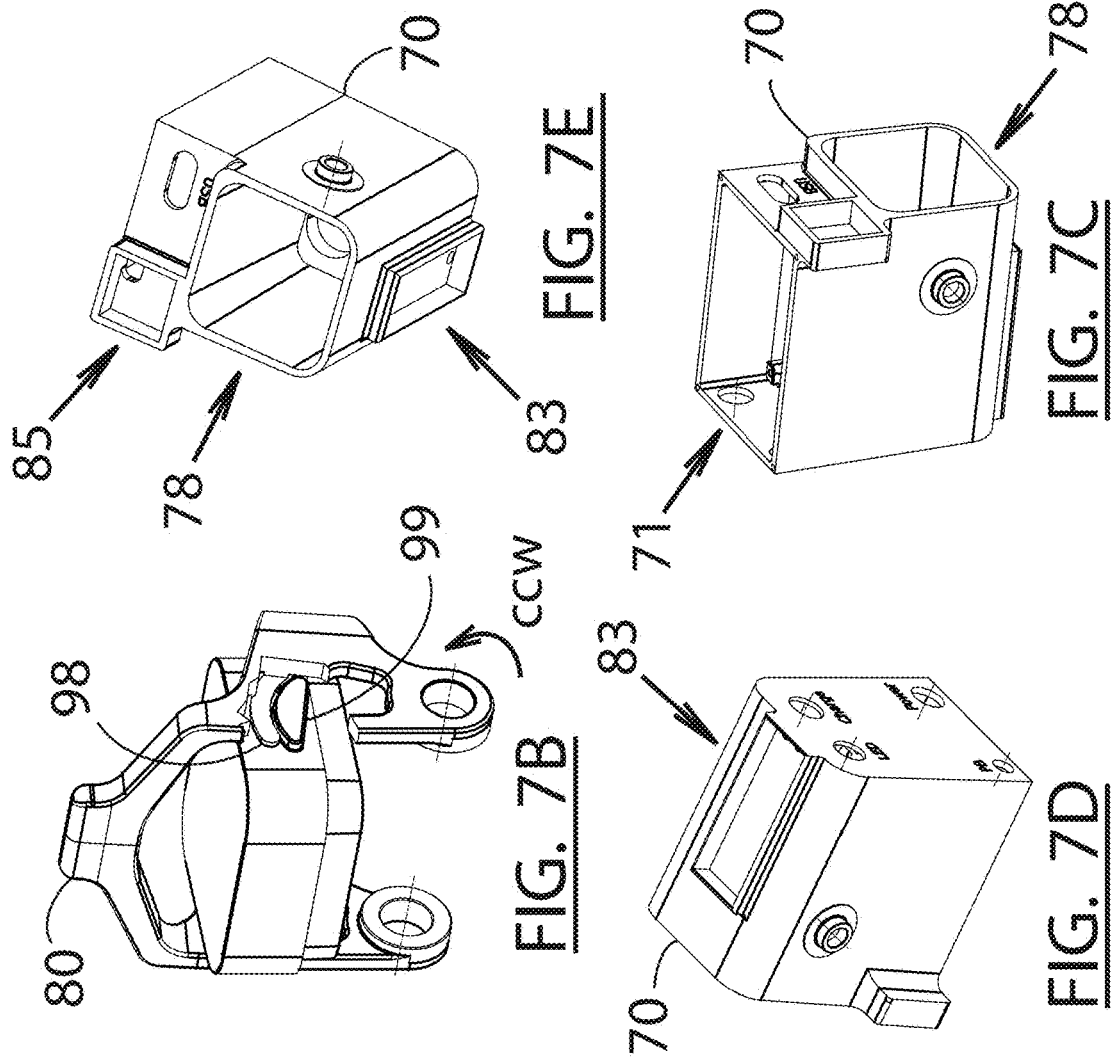

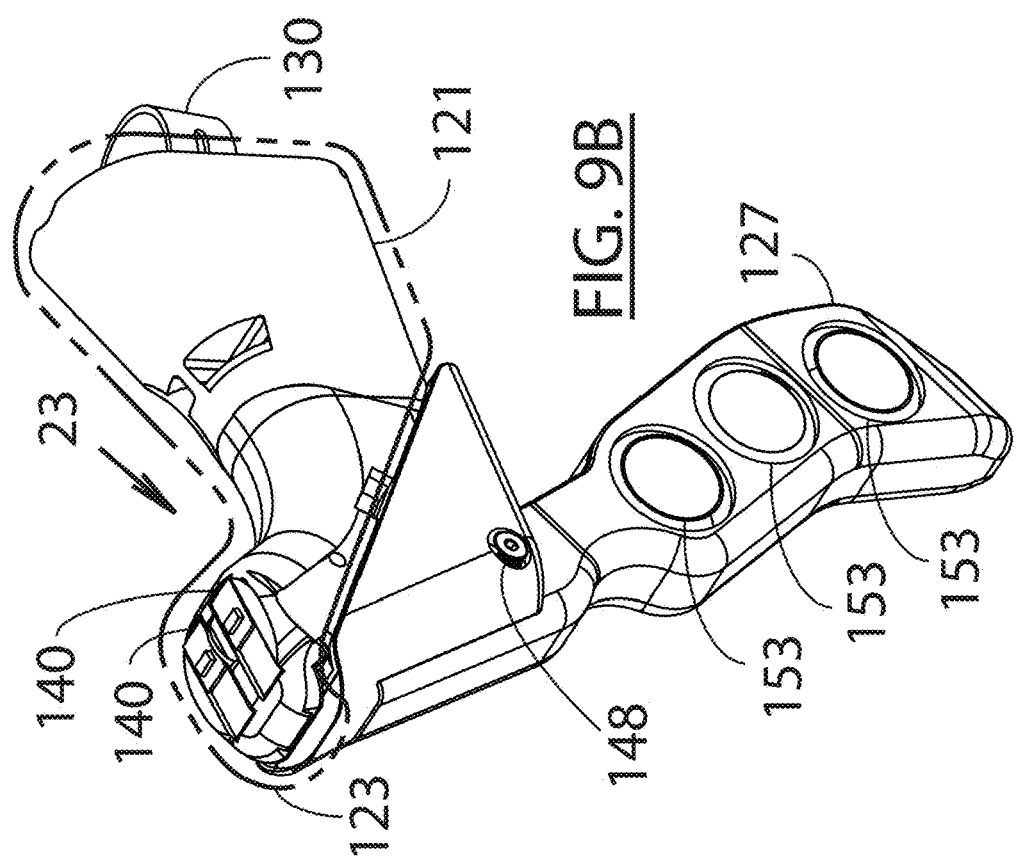
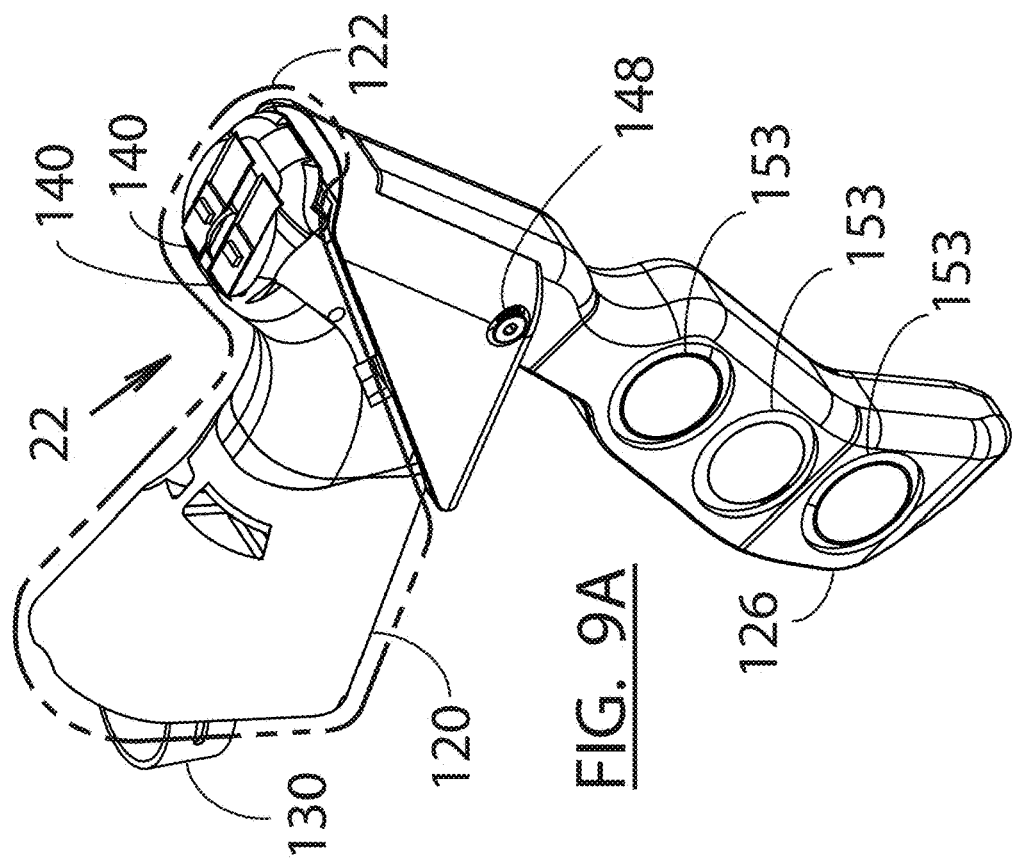

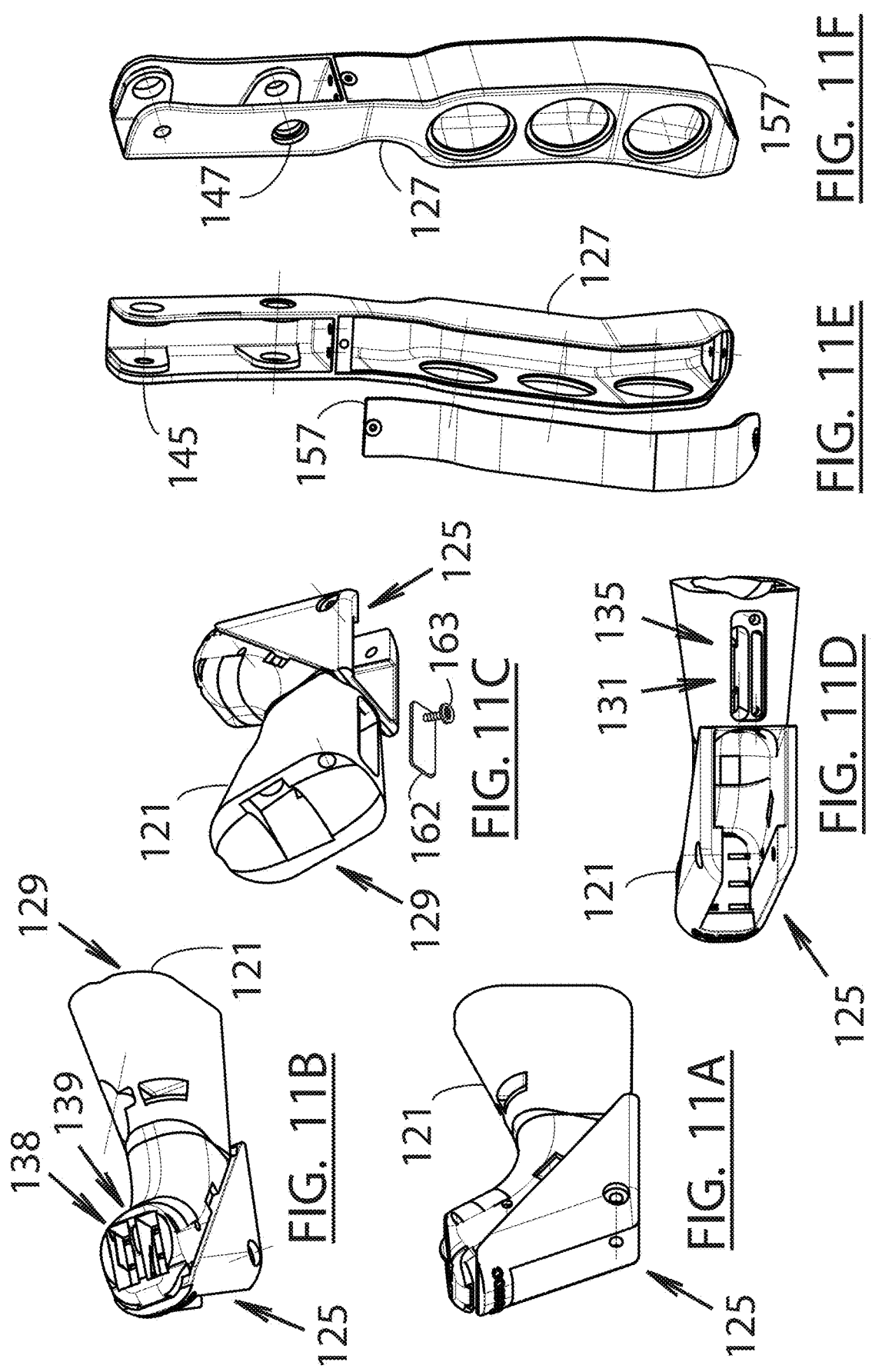

Controller 19, Right Shifter 22 & Left Shifter 23 Ibeacon/beacon advertising Packet 0x020106 1AFF FFFF 0215 FDA50693A4E24FB1AFCFC6EB076647825 271B 4CB9 C9 0D09 XXXXXXXXXXXXXXXX00000000 1016 425241 56 320653B3EBF5 01 02 000000

| Data | Bytes | Details |
|---|---|---|
| 020106 | 3 | Flags for discoverability. |
| FFFF | 2 | General beacon |
| FDA50693A4E24FB1AFCFC6EB076647825 | 16 | UUID:FDA50693-A4E2-4FB1-AFCF-C6EB076647825 |
| 271B | 2 | Major:10011 |
| 4CB9 | 2 | Minor:19641 |
| C9 | 1 | One meter RSSI:-55dB |
| XXXXXXXXXXXXXXXX00000000 | 12 | Advertising name |
| 56 | 1 | Remaning Power - 86% |
| 320653B3EBF5 | 6 | MAC address |
| 01 | 1 | Advertising interval level: 1 |
| 02 | 1 | Radio transmit power level: 2 |

FIG. 12

| CONTROLLER 19, SHIFTER 22 AND SHIFTER 23 BLUETOOTH LOW ENERGY (BLE) HANDSHAKE PROTOCOL | | |
|---|---|---|
| BLE Service UUID | 6E400001-B5A3-F393-E0A9-E50E24DCCA9E | Operator Panel 20 Connects to Controller 19 and Shifters 22 & 23 |
| Feature UUID-1 Write | 6E400002-B5A3-F393-E0A9-E50E24DCCA9E | Application Program (APP) 43 writes to Controller 19 and Shifters 22 & 23 |
| Feature UUID-2 Notify | 6E400003-B5A3-F393-E0A9-E50E24DCCA9E | Controller 19 and Shifters 22 & 23 write to Application Program (APP) 43 |
| Brake Shifters 22 & 23 to Operator Panel 20 Application Program (APP) 43 Button Press Notify | | |
| No | Command | |
| 1 | Button Status Update | Shifters 22 and 23 send pressed button Count F3 40 F3 XX YYYYYY Where XX is Button 1-5 and YYYYYY Current Press Count |
| | | APP 43 Acknowledges in Hex F3 40 F3 ACK ACK=0 -> Succcessful |
| Operator Panel 20 Commands to Controller 19, Right Brake Shifter 22 & Left Brake Shifter 23 | | |
| No | Command | APP 43 Writes to Controller 19, Shifters 22 & 23 |
| | | Controller 19, Shifters 22 & 23 Aknowledge |
| 1 | Modify Transmit Power | F3 06 F3 XX XX is 1 byte for Transmission Power; Value Min. XX=0 -- > -40dB - Max. XX=6 --> 4dB; |
| | | F3 06 F3 ACK ACK=0 -> Succcessful |
| 2 | Modify Packet Send Interval | F3 07 F3 XX XX is 1 byte for Transmission Frequency; Value Min. XX=0 --> 100ms to Max. XX=6 --> 10ms |
| | | F3 07 F3 ACK ACK=0 -> Succcessful |
| 3 | Modify No Action Sleep Timeout | F3 08 F3 XXXX Where XX is a 2 byte hex value in seconds |
| | | F3 08 F3 ACK ACK=0 -> Succcessful |
| 4 | Get Battery Level | F3 16 F3 3 bytes |
| | | F3 16 F3 XX XX Battery % in Hex |

FIG. 13

ELECTRICAL DERAILLEUR CONTROLLER

CROSS-REFERENCE TO RELATED APPLICATIONS

This application is a divisional of U.S. patent application Ser. No. 19/075,568, filed on Mar. 10, 2025, which is titled "Electrical Derailleur Brake Shifter" and is currently allowed.

FEDERALLY SPONSORED RESEARCH

Not Applicable

SEQUENCE LISTING OR PROGRAM

Not Applicable

FIELD OF THE INVENTION

The disclosed invention relates to the cycling transportation and sporting industry, specifically to modern bicycle designs typically making use of front and rear electrically powered drive chain derailleurs serving to alternate drive chain position between different ratio chain rings and cassette sprockets through wired or wireless connections to a rider controls apparatus, thereby permitting the rider to achieve an optimal drivetrain ratio through selection of an adequate combination of chain rings and cassette drive sprockets, thereby facilitating comfortable pedaling rates and efforts thereof depending on desired road speed, rider conditioning, road inclination and other circumstantial conditions.

BACKGROUND OF THE INVENTION

Bicycles have existed for many years serving throughout as transportation and sporting means. Over the great time span since their inception, the technology has evolved with numerous designs and advancements predominantly geared toward addressing rider comfort. With the initial designs from many years ago comprising a single speed power transmission mechanism often requiring the rider to either exert undue effort on the pedals or have to alternate the pedals at an uncomfortably high rate to achieve desired riding speed, a need was recognized for multiple powertrain ratios to facilitate acceptable rider pedaling rates and efforts. A variety of designs consequently emerged where additional power transmission sprockets of various number of teeth but equal pitch were added in the axial directions of power transmission rear wheel as well additional chain rings in the pedals assembly with both innovations thereof combined with mechanical shifting mechanisms to facilitate a combination of front and rear power transmission ratios resulting in optimal settings based on desired bicycle speeds, road conditions, rider biometrics and preference. These advancements in the art were facilitated by the de-facto standard four bar linkage mechanism-based derailleur assembly used to this very day to alternate drive sprockets through properly positioning the bicycle drive chain thereto as well as compensate for resultant varying chain lengths through integral spring-loaded chain tensioning mechanisms. The advanced shifting capability was typically facilitated by a set of two cable tensioning apparatuses, one for rear derailleur and another for the front derailleur. With one end of each cable apparatus being connected to the derailleur chain positioning mechanism and the other end to a rider actuation mechanism typically comprising a lever assembly, this apparatus granted the rider the ability to alternate the chain position in the axial position for proper alignment and thereby engagement of selected rear wheel sprockets and pedals chain rings in order to achieve optimal power transmission ratio settings. Advancements in the actuation mechanisms included indexing capability of the rider lever assembly so that the actuation of the derailleur mechanisms takes place in an indexing fashion consistently properly aligning the chain to the desired sprocket thereof rather than one continuous motion requiring the rider to guess the proper chain position often leading to positioning errors.

Most recent developments, stemming from desire to eliminate shifting cables altogether and additionally replacing rider mechanical actuation lever-based shifter mechanisms with electrical switching devices controlling powered derailleurs, comprised incorporation of small DC motors typically acting through a worm and spur gearset to drive the derailleur mechanisms through actuation of one of the joints of their four bar linkages, equally applicable to both rear and front derailleurs.

With most OEM's being conscious about weight of the additional power shifting components, multiple rear derailleur designs emerged making use of smallest possible size electric motors possible for weight savings. With most of these designs additionally relying on worm gearing for substantial speed reduction and thereby torque amplification, and notwithstanding the approximate 30% inherent losses of such implementations due to worm gearing inefficiencies, most of these modern derailleur designs are typically capable of conducting one gear shift in a reasonable amount of expected shift time with only enough power to move the shifting cable from engaged to adjacent cassette sprocket or chain ring.

A particular situation arises when the rider is moving at a relatively high speed and needs to brake. He or she is forced to trigger multiple shift combinations to attain a shifting ratio suitable for restart after stoppage. Failure to do so in the relatively short braking time thereby forces the rider to re-initiate motion at a non-optimal cassette sprocket/chain ring combination leading to slower starts and discomfort due to the additional effort the rider has to exert on the bicycle pedals in order to re-initiate motion.

Almost totally unexpected, inventor has discovered that implementation of a standard high power and highly efficient Remote Control (RC) servo apparatus, and notwithstanding inherent weight penalty and somewhat additional stresses on the chain, a proper Remote Control (RC) servo implementation in an properly designed rear derailleur with proper controls thereof is capable of shifting the drive chain arbitrarily between cassette sprockets thereby skipping over however many needed to seek a desired cassette sprocket, or i.e. conducting shift from largest to smallest cassette sprocket or vice-versa for the rear derailleur in one motion via one command from the rider. With this capability thereof being equally applicable to the front derailleur as well, the rider is able to seek an optimal cassette sprocket/chain ring combination with one shifter command. This capability is henceforth divided into two categories with the first being denoted as "Skip Shift" where shifting motion entails skipping over cassette sprockets whereby the rear derailleur is able to step from an arbitrary sprocket to a smaller or larger cassette sprocket as for example two or three steps higher or lower in one motion most useful when the rider encounters a severe road inclination change either uphill or downhill where a single up shift or down shift becomes inadequate thereby having to trigger the shifting controls a number of time, this action as proposed instead, can be achieved with once shifter command from the rider. The latter outlined capability being denoted "Drop Shift" is reserved in this disclosure to shifting to an optimal cassette sprocket/chain ring combination for re-initiation of bicycle motion from a full stop whereby conducting the shifting motion takes place from an arbitrary cassette sprocket/chain ring combination to a select and predefined larger cassette sprocket/smaller chain ring combination in one action thereof taking place fairly quickly prior to the rider pressing the bicycle brakes to a full stop thereby addressing the rider re-start discomfort situation outlined prior.

Augmented with additional capability to program this type of shifting motion through a proper user interface, controls as well as additional shifter pushbuttons, the rider is granted the ability to assign shifter buttons for both outlined "Drop Shift" as well as "Skip Shift" actions along with additional advanced functionality thereof made possible by disclosed advanced controls.

DISCUSSION OF PRIOR ART

The following is a brief summary of prior art deemed pertinent to the Electrical Derailleur Brake Shifter of the present invention.

U.S. Pat. No. 12,240,562 B2 discloses a bicycle derailleur including a control system with switches SW11, SW12, SW21 and SW22 dedicated to upshifting and downshifting a rear derailleur and a front derailleur. Notwithstanding the excellent functionality provided by the disclosed apparatus lacks the flexibility of permitting the rider to arbitrarily assign functions to each switch.

U.S. Pat. No. 12,060,129 B2 discloses a bicycle shifter elaborate controls scheme for wireless communication with a bicycle front and rear derailleur. Although this disclosure sheds much light on a bicycle wireless communication system, it is somewhat lacking in definition of the necessary power source as well as any power conservation measures by granting the rider the ability to control fundamental parameters of shifter power utilization.

U.S. Pat. No. 11,565,766 B2 outlines an elaborate mechanical shifter arrangement with two switches that generate electricity connected to a wireless communication unit. However, detailed this disclosure is, it falls short of defining a battery or at least a power storage means for the boasted electricity generating switches, a must for powering any wireless transmission means reliably.

U.S. Pat. No. 9,491,788 B1 discloses a bicycle wireless control system with ability to scan and wirelessly pair a terminal device, seemingly a computer or a cellphone to a first and second bicycle component. However, entailed in some respects, this disclosure falls short of providing necessary operating details not limited to lack of definition of a thereof necessary powering source or rider operated control devices.

U.S. Pat. No. 9,229,712 B2 discloses an entailed bicycle communication interface including shift switches, junction boxes, and a battery all interconnected to a front and rear bicycle derailleur. Although this disclosure clearly outlines a reliable working arrangement, it lacks the luxury of the simplistic installation of wireless communication devices along with inherent limited shifting ability provided to the rider comprising only two switches with most likely ability is shifting each of the front and rear derailleurs up and down.

U.S. Pat. No. 8,655,548 B2 discloses yet another bicycle control system with a user interface provided with both of a wired as well as a wireless configuration. However entailed and workable the outlined system is, making use of only three user interface switches it lacks the necessary entailed functionality for complex operation of today's modern bicycle controls.

Notwithstanding the extensive endeavor in the art, a highly versatile Electrical Derailleur Shifter with highly desirable characteristics not limited to permitting rider over control functions to minimize battery energy utilization, with programming ability for operation in a Manual Mode as well as bearing the ability to override shifting in an Automatic Shift Mode, and with additional functionality available through a touch screen user interface as well as a good plurality of shifter switches permitting more than just actuation of the front and rear derailleurs, remains elusive.

BRIEF SUMMARY OF THE INVENTION

Applicant discloses a comprehensive handlebars brake shifters based controls apparatus for a bicycle making use of Remote Control (RC) servo based front and rear derailleurs, with thereof most functionality being equally applicable to standard front and rear derailleurs. The proposed system makes use of a pair of versatile handlebars mechanical brake shifters comprising three shifter pushbuttons embedded in each of right and left brake levers with an additional two click microswitches cloaked under the hood of each shifter for a total of five fully programmable switches per side. With each shifter being powered by a lightweight coin cell battery with operation thereof governed by a microcontroller running a proprietary firmware with I/O connections to disclosed switches and including an integral Bluetooth Low Energy (BLE) transmitter, communication thereof of rider pushbutton and microswitch presses is in turn communicated to a rider touchscreen display device running an application program serving to display system status as well as intercept rider shifter command thereof, in turn, relayed along with additional commands issued via rider touchscreen display through a Bluetooth Low Energy (BLE) interface to a microprocessor based central controller with wired connections to each of a front and a rear derailleur. The microprocessor based central controller is responsible for generating the necessary pulse width modulated waveforms for actuation of both Remote Control (RC) servo devices and additionally makes use of an inertial three axis accelerometer, a gyro and an environmental sensor for measurement of acceleration, inclination, temperature, humidity and pressure all relayed back to the application program running on the rider touchscreen display device through the same thereof Bluetooth Low Energy (BLE) communication protocol with the application program of the touchscreen display device serving assumption of total system control based on feedback from the central controller along with commands issued by the rider through the touchscreen display, the right brake shifter and the left brake shifter.

BRIEF DESCRIPTION OF THE DRAWINGS

FIG. 5 is a system architecture view of the preferred embodiment of the controls apparatus of a bicycle making use of the preferred embodiment of the Electrical Derailleur Brake Shifter of the present invention.

FIG. 6A is a dimetric view of the preferred embodiment of the controller of a bicycle making use of the preferred embodiment of the Electrical Derailleur Brake Shifter of the present invention.

FIG. 6B is an exploded view depicting the internal components of the preferred embodiment of the controller of a bicycle making use of the preferred embodiment of the Electrical Derailleur Brake Shifter of the present invention.

FIG. 6C is an exploded view of the major electrical components of the preferred embodiment of the controller of a bicycle making use of the preferred embodiment of the Electrical Derailleur Brake Shifter of the present invention.

FIG. 6D is a plan view of the circuit board of the preferred embodiment of the controller of a bicycle making use of the preferred embodiment of the Electrical Derailleur Brake Shifter of the present invention.

FIG. 7A is an exploded view of the battery sealing assembly of the preferred embodiment of the controller of a bicycle making use of the preferred embodiment of the Electrical Derailleur Brake Shifter of the present invention.

FIG. 7B is a dimetric view of the battery sealing cover and cam action clamp of the preferred embodiment of the controller of a bicycle making use of the preferred embodiment of the Electrical Derailleur Brake Shifter of the present invention.

FIG. 7C is an oblique view depicting the cavities for the circuit board and the battery of the preferred embodiment of the controller housing of a bicycle making use of the preferred embodiment of the Electrical Derailleur Brake Shifter of the present invention.

FIG. 7D is an oblique view depicting the cavity for the LED display of the preferred embodiment of the controller housing of a bicycle making use of the preferred embodiment of the Electrical Derailleur Brake Shifter of the present invention.

FIG. 7E is an oblique view depicting the cavities for the battery, the LED display and the environmental sensor of the preferred embodiment of the controller housing of a bicycle making use of the preferred embodiment of the Electrical Derailleur Brake Shifter of the present invention.

FIG. 9A is a perspective view of the right brake shifter of a bicycle making use of the preferred embodiment of the Electrical Derailleur Brake Shifter of the present invention.

FIG. 9B is a perspective view of the left brake shifter of a bicycle making use of the preferred embodiment of the Electrical Derailleur Brake Shifter of the present invention.

FIG. 11A is a dimetric view depicting the cavity for the brake lever of the left brake shifter of a bicycle making use of the preferred embodiment of the Electrical Derailleur Brake Shifter of the present invention.

FIG. 11B is an oblique view depicting the cavities for the brake lever, the microswitches and the handlebar clamp of the left brake shifter of a bicycle making use of the preferred embodiment of the Electrical Derailleur Brake Shifter of the present invention.

FIG. 11C is an oblique view depicting the cavities for the brake lever and the handlebar clamp along with the cover of the battery and microcontroller cavities of the left brake shifter of a bicycle making use of the preferred embodiment of the Electrical Derailleur Brake Shifter of the present invention.

FIG. 11D is an oblique view depicting the cavities for the brake lever, the coin cell battery and the microcontroller of the left brake shifter of a bicycle making use of the preferred embodiment of the Electrical Derailleur Brake Shifter of the present invention.

FIG. 11E is an oblique exploded view of the left brake shifter lever and cover of a bicycle making use of the preferred embodiment of the Electrical Derailleur Brake Shifter of the present invention.

FIG. 11F is an oblique assembly view of the left brake shifter lever and cover of a bicycle making use of the preferred embodiment of the Electrical Derailleur Brake Shifter of the present invention.

FIG. 12 is a table depicting the Ibeacon advertising packet of the Bluetooth Low Energy (BLE) communication protocol of the preferred embodiment of the controller and shifters of a bicycle making use of the preferred embodiment of the Electrical Derailleur Brake Shifter of the present invention.

FIG. 13 is a table depicting the handshaking and associated functionality of the Bluetooth Low Energy (BLE) communication protocol of the preferred embodiment of the controller and shifters of a bicycle making use of the preferred embodiment of the Electrical Derailleur Brake Shifter of the present invention.

DETAILED DESCRIPTION OF THE INVENTION

Figure 1:
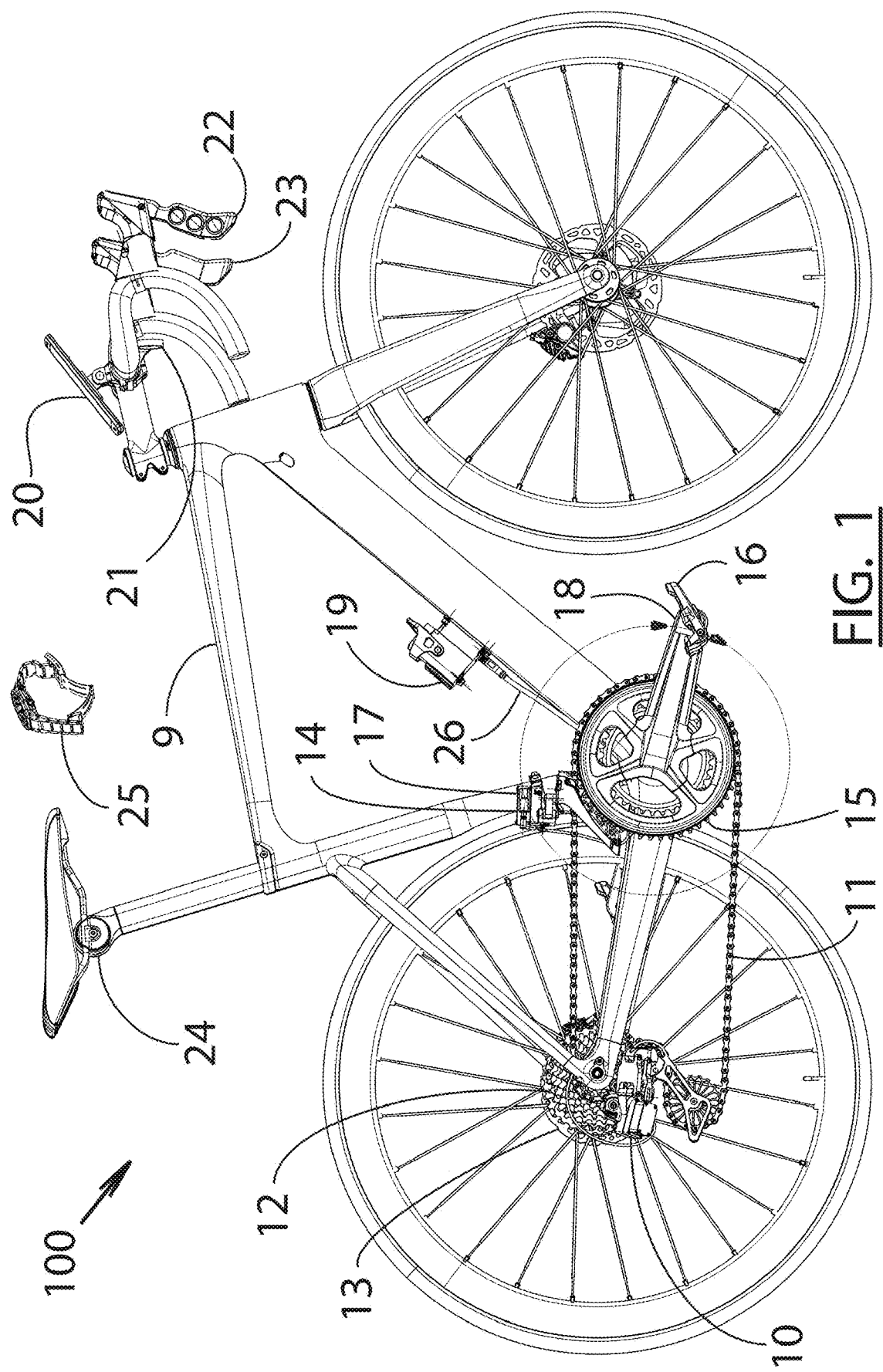
FIG. 1 is an overall view of the mechanical and electrical components of a bicycle making use of the preferred embodiment of the Electrical Derailleur Brake Shifter of the present invention.
Figure 2:
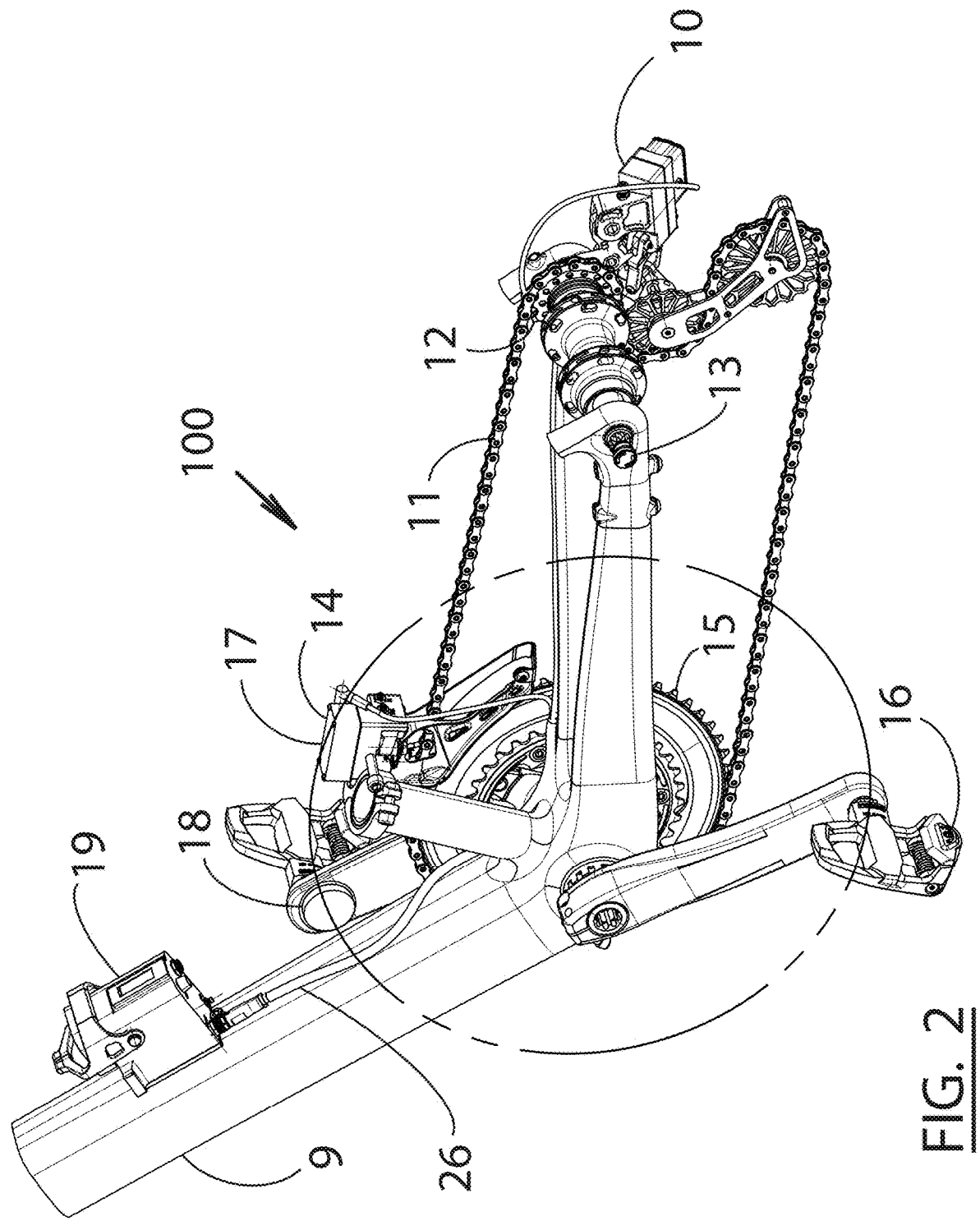
FIG. 2 is a sectional perspective view of the powertrain components of a bicycle making use of the preferred embodiment of the Electrical Derailleur Brake Shifter of the present invention.
Figure 3:
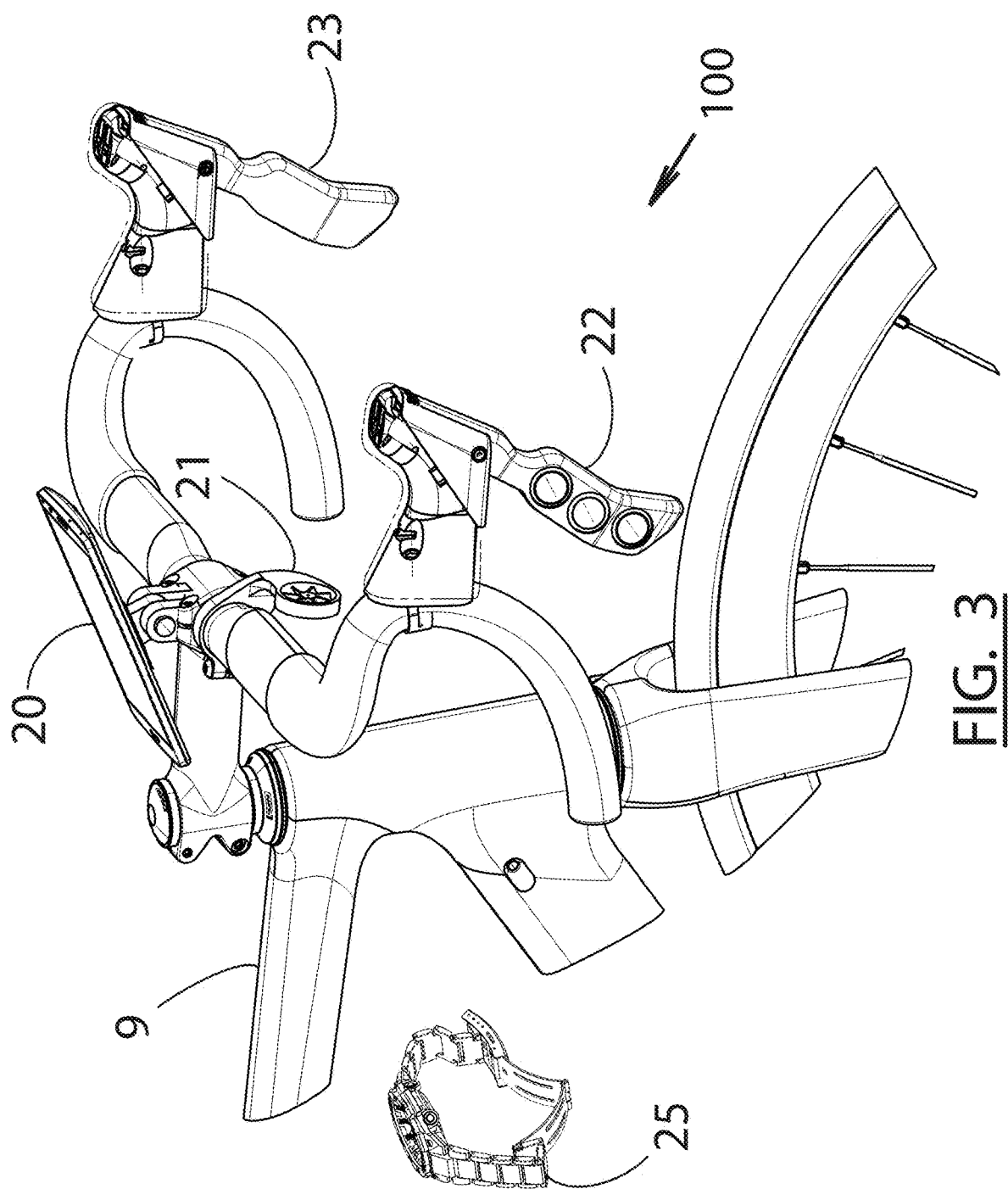
FIG. 3 is a sectional perspective view of a bicycle handlebars, operator panel, vane anemometer, heartbeat monitor and derailleur brake shifters of a bicycle making use of the preferred embodiment of the Electrical Derailleur Brake Shifter of the present invention.

Preferred Embodiment Construction—FIGS. 1-4.

With reference to FIGS. 1-4, the preferred embodiment 100 of a bicycle making use of the preferred embodiment Electrical Derailleur Brake Shifter of the present invention comprise frame 9, rear derailleur 10 serving to alternate chain 11 between sprockets 12 of rear free hub assembly 13, front derailleur 14 serving to alternate chain 11 between chain rings 15 rotationally affixed to front pedals assembly 16, front derailleur optional integral cadence sensor 17, optional right pedal mounted magnet 18, controller 19, operator panel 20, vane anemometer 21, right brake shifter 22, left brake shifter 23, seat force sensor 24, and heartbeat monitor 25 such as a watch as depicted herein or possibly some other wearable devices for the rider. Partially shown wiring harness 26 serves to interconnect controller 19 to rear derailleur 10, front derailleur 14 and optional front derailleur cadence sensor 17.

Figure 4:
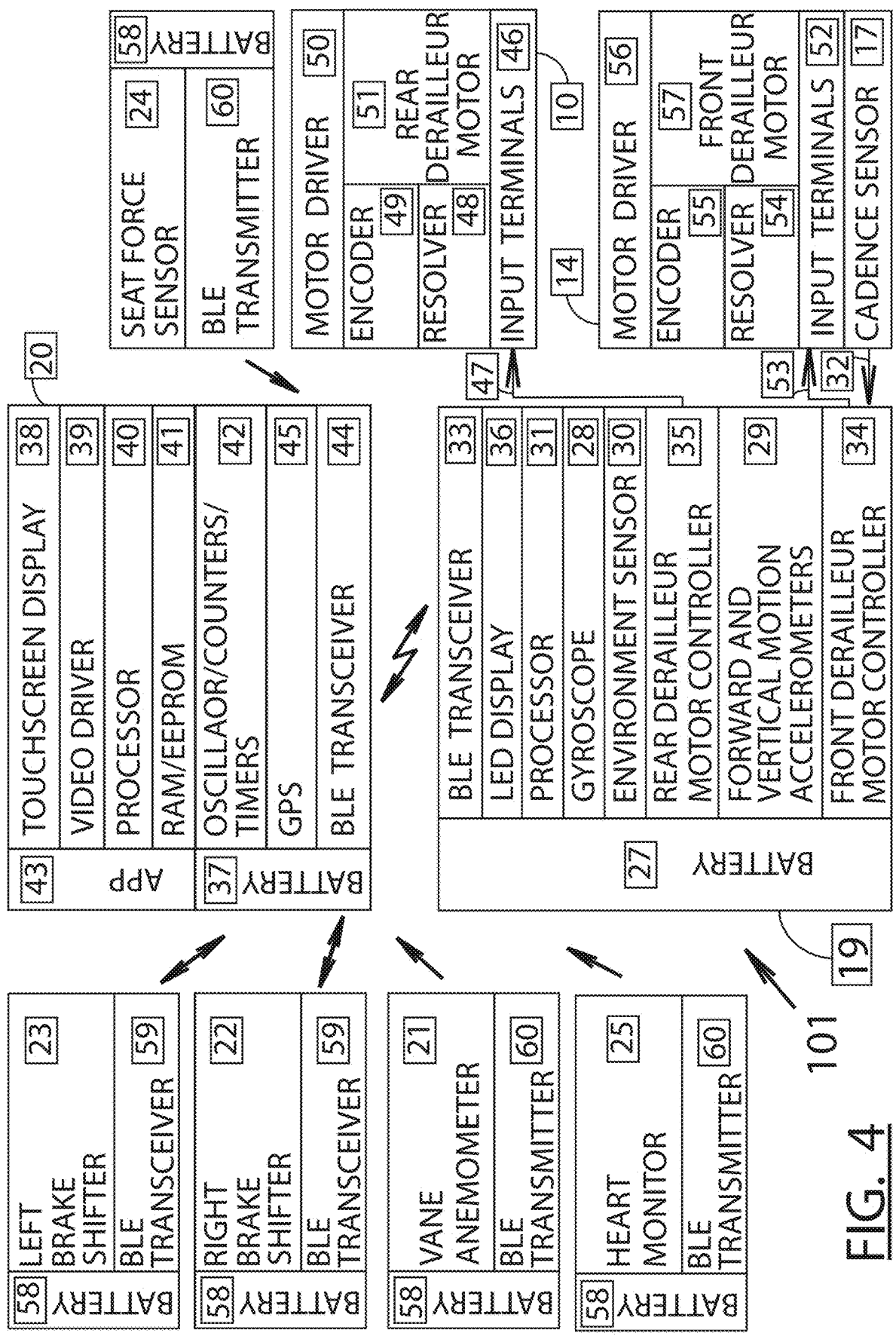
FIG. 4 is a block diagram of the preferred embodiment of the control system of a bicycle making use of the preferred embodiment of the Electrical Derailleur Brake Shifter of the present invention.

Preferred Embodiment Controls—FIG. 4.

With reference to FIG. 4, the preferred embodiment 100 of a bicycle making use of the preferred embodiment Electrical Derailleur Brake Shifter of the present invention makes use of controls block diagram 101 comprising the following subsystems. Controller 19 comprising steady power supply rechargeable battery pack 27, gyroscope 28, forward and vertical motion accelerometers 29, environment sensor 30, processor 31 serving to relay signals from, environment sensor 30, forward and vertical motion accelerometers 29, gyroscope 28, and cadence signal 32 from cadence sensor 17, to operator panel 20 through Bluetooth Low Energy (BLE) transceiver 33 and receive feedback and rider commands thereof in order to execute actuation commands to front derailleur motor controller 34 and rear derailleur motor controller 35 through generation and thereof transmission of actuation Pulse Width Modulation (PWM) waveforms with LED display 36 serving to relay status of controller 19 to the rider at any given time.

Operator panel 20 comprising battery 37, touchscreen display 38, video driver 39, processor 40, memory 41 consisting of random access memory (RAN) and electrically erasable read only memory (EPROM), and balance of controls apparatus 42 not limited to oscillators, counters and timers, act as an integral system serving to execute Application Program (APP) 43 serving to display signal from heartbeat monitor 25 and evaluate readings from cadence sensor 17 relaying pedaling motion, vane anemometer 21 relaying wind speed, seat force sensor 24 relaying rider effort, forward and vertical motion accelerometers 29 relaying acceleration, and gyroscope 28 relaying road inclination, all received through Bluetooth Low Energy (BLE) transceiver 44 aside from commands from right brake shifter 22 and left brake shifter 23, and in turn issue control commands to controller 19 for programmed energization of front derailleur motor controller 34 and rear derailleur motor controller 35. Global positioning system (GPS) 45 integral to operator panel 20, aside from relaying road altitude for inclination evaluation by Application Program (APP) 43, serves to map rider location on touchscreen display 38 for road and trail navigation.

Motor controls subsection of rear derailleur 10 comprises input terminals 46 serving to receive power and control signal 47 from rear derailleur motor controller 35 of controller 19, comparator/resolver 48 serving to compare signal from rear derailleur encoder 49 to received control signal 47 thereof, and accordingly bias motor driver 50 serving to power motor 51 of rear derailleur 10.

Motor controls subsection of front derailleur 14 comprises input terminals 52 serving to receive power and control signal 53 from front derailleur motor controller 34 of controller 19, comparator/resolver 54 serving to compare signal from front derailleur encoder 55 to received control signal 53 and accordingly bias motor driver 56 serving to power motor 57 of front derailleur 14, and again, cadence sensor 17 serving to relay cyclist pedaling motion signal 32 to front derailleur motor controller 34 of controller 19.

Operating as individually powered standard Bluetooth Low Energy (BLE) protocol discrete transmission units, left brake shifter 23, right brake shifter 22, each comprising own battery 58 for power and own Bluetooth Low Energy (BLE) transceiver 59 for thereof wireless handshake communication, as well as vane anemometer 21, seat force sensor 24, and heart rate monitor 25 also each comprising own battery 58 for power and own Bluetooth Low Energy (BLE) transmitter 60 for thereof wireless communication, collectively serve to transmit rider shift commands, rider pedaling force, rider heart rate and wind speed, with data thereof, in turn, intercepted by Bluetooth Low Energy (BLE) transceiver 44 of operator panel 20 for data processing thereof through Application Program (APP) 43.

Control System Architecture—FIG. 5.

With reference to FIG. 5, the controls components defined in controls block diagram 101 of FIG. 4 for a bicycle making use of the preferred embodiment Electrical Derailleur Brake Shifter of the present invention comprise vane anemometer 21, seat force sensor 24, heartbeat monitor 25, each including modular Bluetooth Low Energy (BLE) transmitter 60 for relaying respective signals 61 to operator panel 20, right brake shifter 22 and left brake shifter 23 each including five programmable pushbuttons and switches serving to relay rider shifting commands to operator panel 20 by handshake Bluetooth Low Energy (BLE) signals 62 through transceivers 59, with operator panel 20 running Application Program (APP) 43 and through own asynchronous Bluetooth Low Energy (BLE) transceiver 44 in turn intercepting signals 61 from various transmitters 60 along with signals 62 of rider shifters command from transceivers 59 of right brake shifter 22 and left brake shifter 23, as well as additional rider commands issued through operator panel touchscreen display 38, along with feedback signal 32 from cadence sensor 17 relayed back to controller 19 through hardwired connection 63 and from controller 19 back to operator panel 20 through Bluetooth Low Energy (BLE) signal 64. Upon confirming that desired shifting commands can be met through evaluation of positions of front derailleur 14 and rear derailleur 10 along with presence of necessary pedals actuation by the rider for the shift operation to take place through evaluation of intercepted signal 32 of cadence sensor 17, Application Program (APP) 43 dispatches processed shift commands to controller 19 through asynchronous Bluetooth Low Energy (BLE) signal 64. Controller 19, in turn, intercepts shifting commands signal 64 through own asynchronous Bluetooth Low Energy (BLE) transceiver 33, generates the necessary pulse width modulated waveform signals 47 and 53, and in turn transmits generated signals to front derailleur 14 and rear derailleur 10 through hardwired connections 63 and 65 respectively. Finally, relying on open loop control of controller 19 and including built in overload protection, Remote Control (RC) servo based rear derailleur 10 and front derailleur 14 execute the necessary shift commands.

Running in Automatic Mode, Application Program (APP) 43 of operator panel 20 executes exactly as outlined prior except for shifting commands of front derailleur 14 and rear derailleur 10 which are handled by the programmed logic of Application Program (APP) 43 in lieu of manual rider commands with issue of shifting commands thereof to controller 19, instead, being based on rider automatic shifting settings which are based on various conditions such as speed, acceleration, road inclination, rider effort, cadence and other programmed-in factors for automatic control of front derailleur 14 and rear derailleur 10 by Application Program (APP) 43.

Controller Assembly and Components—FIGS. 6a-6D & 7C-7E.

With reference to FIGS. 6A-6D depicting assembly of controller 19 and with FIGS. 7C-7E depicting thereof housing construction, controller 19 of a bicycle making use of the preferred embodiment Electrical Derailleur Brake Shifter of the present invention comprises housing 70 including a first cavity 71 for circuit board 72 secured thereto by screws 73 and sealed thereof by cover 74 secured to housing 70 by screws 75 acting through gasket 76 with housing 70, and in turn, secured to bicycle frame 9 by screws 77 acting on thereto secured cover 74, second cavity 78 for rechargeable battery pack 27 with power connection to circuit board 72 taking place through wiring (not shown) of battery connector 79 permanently affixed to housing 70 and with sealing of cavity 78 thereof facilitated by pivotal cam clamp 80 acting on cammed cover 81 compressing Oring 82 against lip of housing 70, third cavity 83 for LED display 36 including wired connection (not shown) to circuit board 72 and secured to housing 70 by bonded display cover 84, and finally fourth cavity 85 for environmental sensor 30 including wired connection (not shown) to circuit board 72 and secured to housing 70 by bonded sensor cover 86. Controller 19 additionally comprises keepers 87 serving to pivotally secure cam clamp 80 to housing 70, battery recharge jack 88, battery low LED 89, controller status pushbutton 90, and derailleur receptacle 91 serving to interconnect controller 19 to rear derailleur 10 and front derailleur 14 through connector 92 of wiring harness 26.

With reference to FIGS. 6B-6D, circuit board 72 comprises microcontroller 93 encompassing Bluetooth Low Energy (BLE) transceiver 33 and processor 31 thereof running proprietary firmware serving to generate necessary pulse width modulated signals 47 for rear derailleur 10 and 53 for front derailleur 14 with signal conditioning, connection and transmission thereof taking place through transistors 94, resistors 95 and relays 96 through receptacle 91 through connector 92 through wired connections 63 and 65 of wiring harness 26. Relying on I2C protocol for receipt of signals from environmental sensor 30 and inertial sensor board 97 comprising gyroscope 28 and forward and vertical motion accelerometers 29, and through a hardwired connection from cadence sensor 17, microcontroller 93 transmits to operator panel 20 inertial and environmental data along with cadence signal 32 as well as voltage level of rechargeable battery pack 27 on regular intervals through integral Bluetooth Low Energy (BLE) transceiver 33. Microcontroller 93 additionally runs logic to monitor voltage of rechargeable battery pack 27 and flashes LED 89 when voltage of battery pack 27 is low, makes use of I2C communication to send LED display 36 various rider updates on status of controller 19 as well as diagnostics data thereof upon rider pressing pushbutton 90.

Sealing of Battery Compartment—FIGS. 7a & 7B.

With reference to FIGS. 7A & 7B, environmental protection and dynamic sealing against rain and moisture of battery pack 27 is provided by cam action clamp 80 pivotally operable about keepers 89 and including dual cams 98, one per side, serving to engage mating cams 99, also one per side, of cammed cover 81 with engagement thereof, as cam clamp is actuated in the counterclockwise (CCW) direction as depicted in FIGS. 7A & 7B, serving to precisely compress Oring 82 between mating lips of cammed cover 81 and housing 70. Just as critical is the balance of sealing of all interior compartments of housing 70 which is achieved through gasket 76 for protection of circuit board 72 in compartment 71, sealing by bonding compound agents of compartments 83 and 85 between LED display cover 84 and environmental sensor cover 86 respectively to housing 70, and a static Oring seal for each of battery recharge jack 88, battery low LED 89, controller status pushbutton 90, and derailleur receptacle 91, with outlined comprehensive environmental protection thereof ensuring that controller 19 is waterproof and moisture proof.

Figure 8:
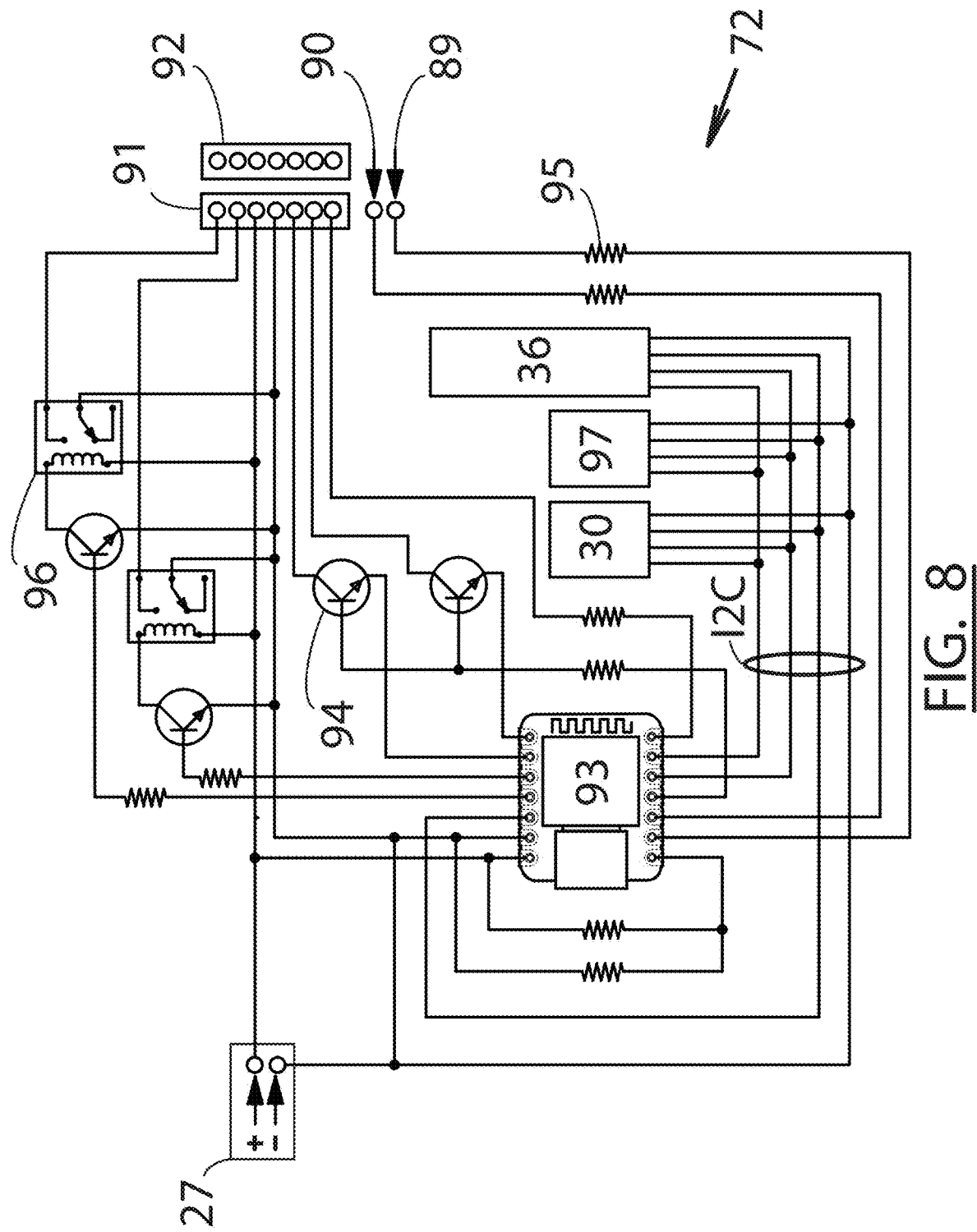
FIG. 8 is a wiring diagram of the preferred embodiment of the controller of a bicycle making use of the preferred embodiment of the Electrical Derailleur Brake Shifter of the present invention.

Controller Schematic & Operation—FIG. 8.

With reference to FIG. 8 depicting wiring diagram for controller 19 of a bicycle making use of the preferred embodiment Electrical Derailleur Brake Shifter of the present invention, actuation of rear derailleur 10 and front derailleur 14 is controlled through wired connections to circuit board 72 comprising microcontroller 93 running proprietary firmware for communication with operator panel 20 through Nordic Bluetooth Low Energy (BLE) Universal Asynchronous Universal Receiver/Transmitter (UART) Service 6E400001-B5A3-F393-E0A9-E50E24DCCA9E for serial communication over Bluetooth Low Energy (BLE) which enables microcontroller 93 to send and receive data to and from Application Program (APP) 43 of operator panel 20 over wireless Bluetooth Low Energy (BLE) as if it was wired directly to Serial COM port of operator panel 20. Upon interception of a compound shift command involving both derailleurs from operator panel 20, microcontroller 93 dispatches to rear derailleur 10 and front derailleur 14 actuation Pulse Width Modulation (PWM) waveform signals 47 or 53 through a first I/O terminal output pin acting through a rear derailleur switching transistor and a second I/O terminal output pin acting through a front derailleur switching transistor with bias signal to enable both transistors provided by a third I/O terminal output pin in response to thereof command from operator panel 20, two additional I/O terminals serving to prevent any power leakage through connection of their output pins to bias terminals of a first switching transistor serving to enable grounding connection of rear derailleur 10 through a first relay and to bias terminal of a second switching transistor serving to enable grounding connection of front derailleur 14 through a second relay with power thereof to each of rear derailleur 10 and front derailleur 14 provided through a direct connection of positive terminal of battery 27, and last an I/O terminal input pin serving to receive signal 32 from optional cadence sensor 17 with all signals thereof transmission taking place through connection of receptacle 91 to derailleur connector 92 through wiring harness 26 leading to rear derailleur 10 and front derailleur 14. Microcontroller 93 additionally employs one additional I/O terminal input pin to receive battery level signal through a voltage diving circuit making use of two resistors with opposite terminals thereof connected to plus and minus terminals of battery 27, one additional I/O terminal input pin serving to receive signal from pushbutton 90 and one additional I/O terminal output pin with conditioned signal thereof serving to flash LED 89 upon microcontroller 93 sensing power level of battery 27 fallen below a thereof programmed threshold. Finally, microcontroller 93 makes use of I2C communication protocol to receive temperature and pressure measurements from environmental sensor 30 as well as accelerometer and gyroscope data from inertial sensor 97 and sends LED display 36 status data of controller 93 as well as diagnostic data upon rider pressing pushbutton 90, with all data thereof communicated to operator panel 20 on regular intervals through aforementioned Bluetooth Low Energy (BLE) handshake communication protocol.

Last, it is incumbent on the applicant to stress that control legs of microcontroller 93 leading to relays 96 for thereof connection of rear derailleur 10 and front derailleur 14 to ground terminal of battery 27 is simply a battery conservation measure with the sole intent of preventing any power drain during idling of either rear derailleur 10 or front derailleur 14 or both from thereof connected power terminal of battery 27. In another less battery conservation demanding application, these two legs can be removed altogether and replaced with permanent connections of ground terminal to each of rear derailleur and front derailleur without any sacrifice to performance of either of rear derailleur 10 or front derailleur 14. Additionally, the two legs of transistor 94 serving to connect pulse width modulation (PWM) signals to rear derailleur 10 and front derailleur 14 along with biasing connection of microcontroller 93 are also battery conservation measures with the sole intent also being the elimination of any power leakage from either ground or power connections of rear derailleur 10 and front derailleur 14 through these terminals. Therefore, both of these transistor legs along with biasing connection can also be eliminated in a less battery conservation demanding application without any loss in performance of either rear derailleur 10 or front derailleur 14.

Figure 10A:
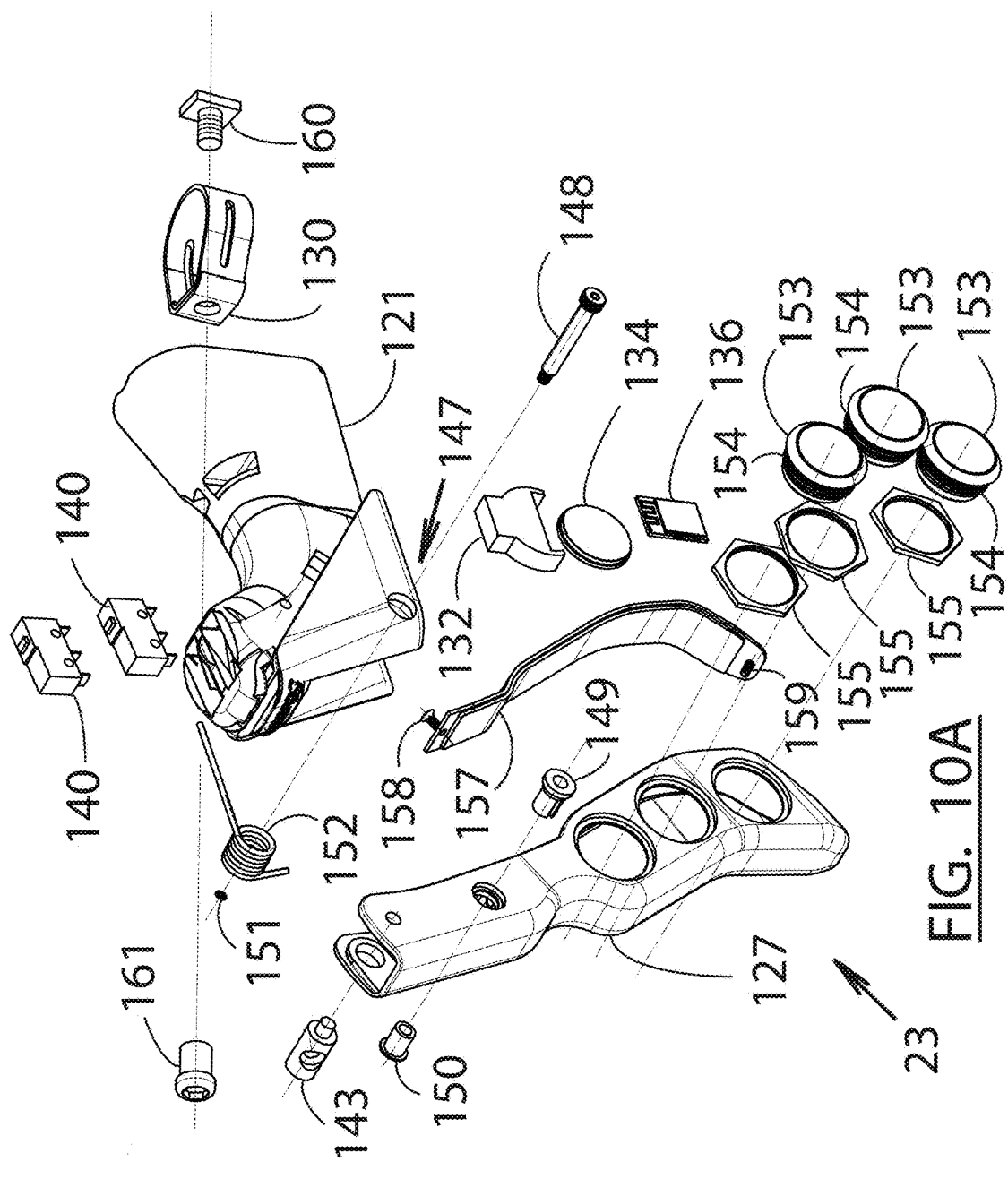
FIG. 10A is an exploded view the left brake shifter of a bicycle making use of the preferred embodiment of the Electrical Derailleur Brake Shifter of the present invention.

Brake Lever Shifters Construction—FIGS. 9A, 9B, 10A, 11A-11F With reference to FIGS. 9A and 9B depicting disclosed right and left brake shifter assemblies 22 and 23, exploded view in FIG. 10A depicting components thereof for the left hand assembly and FIGS. 11A-11F further defining left shifter body and brake lever, general construction of a brake shifter of a bicycle making use of the preferred embodiment Electrical Derailleur Brake Shifter of the present invention, comprise right hand body 120 and left hand body 121 with aesthetics, grip and coverage for sealing of internal components thereof provided by right hood 123 and left hood 124 depicted in FIGS. 9A & 9B in phantom for illustration of internal shifter components thereof, main cavities 124 and 125 of right hand body 120 and left hand body 121 respectively at the front where right brake lever 126 and left brake lever 127 are pivotally operable, mounting cavities 128 and 129 at the rear sculped for proper retention thereof against the bicycle handlebars by pull clamp brackets 130, first small cavity 131 at the bottom of each of right hand body 120 and left hand body 121 for housing coin cell battery holders 132 retained thereto by adhesive sealant 133 (not shown) and serving to retain thereto inserted coin cell batteries 134, adjacent second small cavities 135 for housing microcontrollers 136 with Bluetooth Low Energy (BLE) capability retained thereto by dielectric potting compound 137 (not shown), a third and fourth small rectangular cavities 138 and 139 at the top of right and left bodies 120 and 121 for retention of two pairs of microswitches 140. Right brake lever 126 and left brake lever 127 serving to energize brake cables 141 (not shown), for actuation of right or left bicycle mechanical brake assemblies (not shown), through retention of thereto affixed cable slugs 142 (not shown) retained through engagement thereof with cable nuts 143 inserted through top bore 144 for right brake lever 126 and 145 for left brake lever 127 for brake actuation with draw thereof facilitated by pivot joint 146 of brake lever 126 and 147 of brake lever 127 about shoulder bolts 148 extending through outer flanges of right and left bodies 120 and 121, through outer brake lever sleeve bushings 149, inner brake lever sleeve bushings 150, through inner flanges of right hand body 120 and left hand body 121 wherein they are retained thereto by locknuts 151, torsion springs 152 pivotally operable about right and left brake lever bushings 149 and 150 with one end thereof acting against bottoms of right brake lever 126 and left brake lever 127 with the other end retained in right and left hand bodies 120 and 121 respectively, three pairs of shifter lever pushbuttons 153 with bodies thereof inserted through sealing Orings 154 and fitted through outer flanges of right brake lever 126 and left brake lever 127 and secured thereto internally by locknuts 155, right brake lever closure cover 156 and left brake lever closure cover 157 secured to back of right brake lever 126 and left brake lever 127 respectively by top screws 158 and bottom screws 159, draw screws 160 extending through and thereby serving to draw inner flanges of handlebar pull clamp brackets 130 by retention nuts 161 acting against other ends of right hand body 120 and left hand body 121 thereby serving to secure right brake shifter assembly 22 and left brake shifter assembly 23 to bicycle handlebars. Additionally, small closure rubber covers 162 accurately fitting openings 131 and 135 of each of right hand body 120 and left hand body 121, and retained thereto by small screws 163 serve to protect coin cell batteries 134 and microcontrollers 136 from moisture intrusion.

It is also incumbent on the applicant to stress that although outlined disclosure is based on a cable actuated mechanical brake, replacement of the outlined brake cable with a hydraulic actuator for thereof actuation of a hydraulic brake, bears no effect on the operation of the outlined electrical apparatus and is therefore perfectly possible without loss of any performance of the present invention.

It should also be abundantly clear to any person skilled in the art that simple replacement of microswitches 140 embedded in housings 120 and 121 with pushbuttons is only a simple matter of packaging bearing no impact to the outlined disclosure with thereof incorporation being straightforward. Similarly, the packaging of pushbuttons 153 in the sides of brake levers 126 and 127 is totally arbitrary and was done for simple illustration purposes. In another more elaborate design, pushbuttons 153 could simply be replaced with microswitches with attachment thereof to rear of bodies of brake levers 126 and 127 with actuation thereof achieved through ergonomically friendly levers as is customary to so many current designs. This also bear no impact to the outlined disclosure as thereof incorporation is perfectly doable.

Figure 10B:
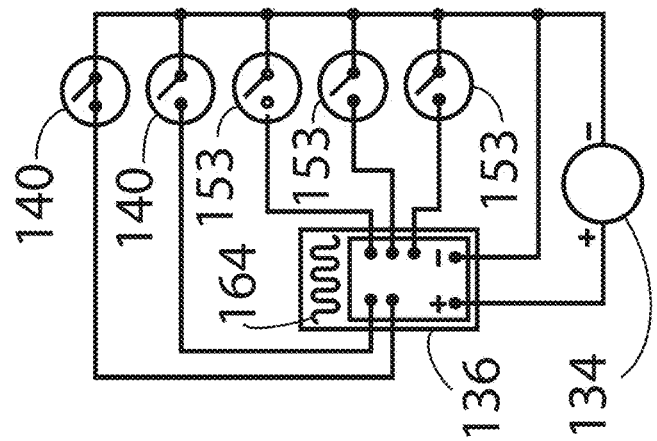
FIG. 10B is a wiring diagram of the brake shifter of a bicycle making use of the preferred embodiment of the Electrical Derailleur Brake Shifter of the present invention.

Shifter Wiring and Operation—FIG. 10B With reference to FIG. 10B depicting wiring diagram for each of right brake shifter 22 and left brake shifter 23 of a bicycle making use of the preferred embodiment Electrical Derailleur Brake Shifter of the present invention, each of right brake shifter 22 and left brake shifter 23 comprise microcontroller 136 making use of a communication protocol with operator panel 20 based on the Nordic Bluetooth Low Energy (BLE) Universal Asynchronous Universal Receiver/Transmitter (UART) Service 6E400001-B5A3-F393-E0A9-E50E24DCCA9E for serial communication over Bluetooth Low Energy (BLE) which enables microcontroller 136 to send and receive data to and from Application Program (APP) 43 of operator panel 20 over wireless Bluetooth Low Energy (BLE) through antenna 164 as if it was wired directly to Serial COM port of operator panel 20. Powered by a standard CR2032 3V coin cell battery with direct connection of positive and negative terminals thereof, microcontroller 136 additionally includes 5 programmable I/O terminals serving as inputs with connections thereof to one side of microswitches 140 and brake lever pushbuttons 153 and with all opposite microswitch and pushbutton terminals connected to ground terminal of microcontroller 136. Upon the rider pressing any of microswitches 140 or pushbuttons 153, state of respective I/O terminal is pulled from high to low thereby triggering transmission of respective Bluetooth Low Energy (BLE) code serving to communicate rider actuation of energized microswitch or pushbutton to operator panel 20 which in turn dispatches respective shift command to controller 19.

Controller and Shifters Advertising—FIG. 12

With reference to table in FIG. 12 depicting wireless transmission advertising protocol for each of controller 19, right brake shifter 22 and left brake shifter 23 of a bicycle making use of the preferred embodiment Electrical Derailleur Brake Shifter of the present invention, each of right brake shifter 22 and left brake shifter 23 upon insertion of coin cell batteries 134 into coin cell battery holders 132 for powerup as well as controller 19 upon insertion of battery pack 27, transmit standard Ibeacon advertising packets which upon receipt and proper interpretation by Application Program (APP) 43 of operator panel 20 enables thereof identification for wireless connection. Table in FIG. 12 summarizes characteristics for each transmission comprising, flags for discoverability, Ibeacon UUID, major and minor network sub-region values, transmission power, advertising name, battery power, microcontroller MAC address, and last default advertising interval and transmission power for each unit.

Controller and Shifters Communication—FIG. 13

With reference to table in FIG. 13 summarizing Bluetooth Low Energy (BLE) communication protocol between controller 19, right brake shifter 22, left brake shifter 23 with operator panel 20, upon discovery and proper interpretation of advertising packets of controller 19, right brake shifter 22 and left brake shifter 23, Application Program (APP) 43 of operator panel 20 fetches and uses Bluetooth Low Energy (BLE) Service 6E400001-B5A3-F393-E0A9-E50E24DCCA9E to establish connection with each device in order to subsequently receive rider button press commands from right brake shifter 22 and left brake shifter 23 and operational data from controller 19 using Bluetooth Low Energy (BLE) services 6E400003-B5A3-F393-E0A9-E50E24DCCA9E and accordingly respond with thereof acknowledgement upon successful packet interception using service 6E400002-B5A3-F393-E0A9-E50E24DCCA9E. Application Program (APP) 43, in turn, analyses and adjust received shift command as necessary followed by thereof dispatch also using Bluetooth Low Energy (BLE) service 6E400002-B5A3-F393-E0A9-E50E24DCCA9E to controller 19 for execution. Upon opening communication channels between operator panel 20 and each of controller 19, right brake shifter 22 and left brake shifter 23, a positive handshake protocol implementation entailing send and receive wireless transmission is established to ensure maximum power savings, most critical for shifters coin cell batteries 134, with wireless transmission immediate cessation taking place upon acknowledgement of received packets. On operator panel 20 side, Application Program (APP) 43 employs five registers for up to date button press count maintenance for each of right brake shifter 22 and left brake shifter 23 with updates thereof taking place in real time upon receipt of button status update Bluetooth Low Energy (BLE) notify service transmission listed in Table in FIG. 13 from each of right brake shifter 22 and left brake shifter 23 via command including hex sequence F3 40 F3 XX YYYYYY through direct write to register XX of press count YYYYYY of Application Program (APP) 43 of operator panel 20 followed by acknowledgement response including hex sequences F3 40 F3 0 upon successful receipt denoted by the command subscript 0 in the transmission, in turn followed by thereof analysis by Application Program (APP) 43, adjustment and dispatch to controller 19 for execution. For maximum power savings, the disclosed preferred embodiment Electrical Derailleur Brake Shifter of the present invention give the rider total control over power utilization and savings of coin cell Batteries 134 through ability to modify transmission power, advertising intervals and sleep timeout individually for each of right brake shifter 22 and left brake shifter 23, through commands including hex sequences F3 06 F3 XX, F3 07 F3 XX, F3 08 F3 XX where XX denotes power level, frequency and timeout in each command respectively followed by thereof acknowledgement of receiving device as outlined prior. Finally, the rider is continually presented with status of coin cell batteries 134 for each of right brake shifter 22 and left brake shifter 23 as well as that of battery 27 of controller 19 on touchscreen display 38 of operator panel 20 through regular execution of battery level command including hex sequences F3 16 F3 by Application Program (APP) 43.

Figure 14:
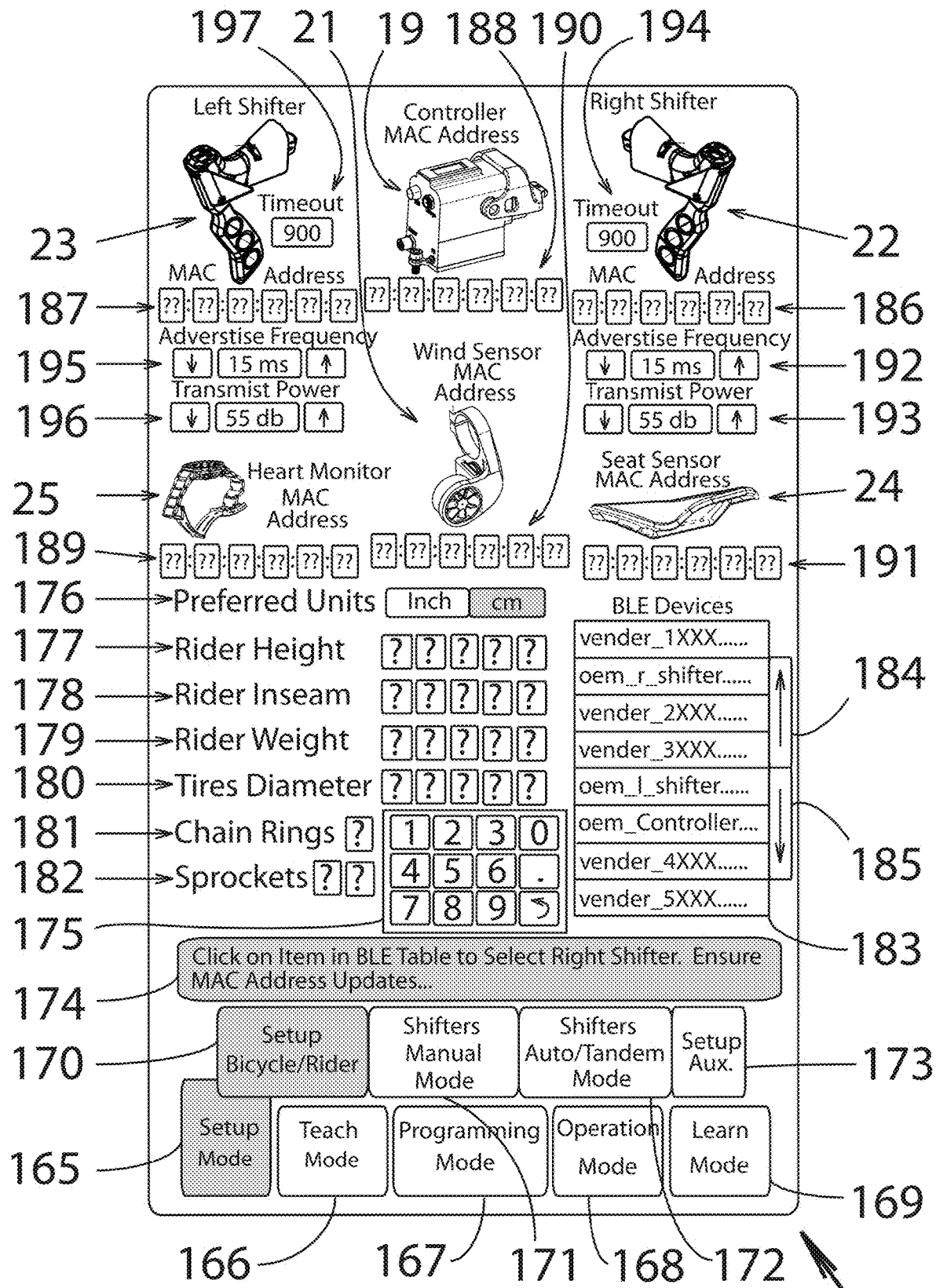
FIG. 14 is view of the bicycle, rider and Bluetooth Low Energy (BLE) devices setup user interface for programming the controls of a bicycle making use of the preferred embodiment of the Electrical Derailleur Brake Shifter of the present invention.

Shifters Controls Setup—FIG. 14

With reference to FIG. 14 depicting screen 201 of touchscreen display 38 for a bicycle making use of the preferred embodiment Electrical Derailleur Brake Shifter of the present invention, with entry thereof taking place upon powerup of operator panel 20 and rider pressing Setup Mode button 165 out of menu selections additionally containing teach mode 166, programming mode 167, operation mode 168 and learn mode 169. Screen 201 comprises the most basic controls functionality needed for setup of herein disclosed bicycle controls which upon entry presents the rider with three selections, setup Bicycle/Rider button 170 where rider enters bicycle controls pertinent information, shifters Manual Mode button 171 used by rider to define action of microswitches 139 and pushbuttons 153 for each of right brake shifter 22 and left brake shifter 23 in manual mode, shifters Auto/Tandem Mode button 172 used by the rider to define action of microswitches 139 and pushbuttons 153 of right bake shifter 22 and left brake shifter 23 in automatic and semi-automatic tandem operation modes, and last Setup Aux. Mode button 173 reserved for future firmware upgrades and other controls improvements. With rider continually guided through this controls setup procedure by prompt window 174, rider is instructed to use numeric keypad 175 to enter rider pertinent information including preferred units 176 inch/lbs. or cm/kg, rider height 177 and inseam 178 measurements used for wind resistance computations, rider weight 179 used for acceleration computations, tires diameter 180 along with chain rings 181 and cassette sprockets 182 for later on programming as well as thereof combination serving for speed computations during pedaling motion. Additionally, rider uses Bicycle/Rider Setup screen to define Bluetooth Low Energy (BLE) peripherals for thereof bicycle control through window 183 serving to enumerate available devices as well as making use of scroll up arrow 184 and scroll down arrow 185 which enables rider to bring desired device within view with subsequent click on thereof respective entry leading to connection to that device by Bluetooth Low Energy (BLE) transceiver 44 and thereof confirmation by population of MAC device information into MAC address window 186 for right shifter 22, MAC address window 187 for left shifter 23, MAC address window 188 for controller 19, MAC address window 189 for heart monitor 25, MAC address window 190 for vane anemometer 21 and MAC address window 191 for seat force sensor 24. With heart monitor 25, seat force sensor 24 and vane anemometer 21 and/or thereof combination being optional, thereto connection is not mandatory so that rider can proceed to next screens for programming of right brake shifter 22 and left brake shifter 23. Last, rider is granted ability to enter operation parameters for right shifter 22 consisting of advertise frequency 192 in milliseconds, transmission power 193 in decibels and timeout 194 in seconds which defines sleep mode upon lack of button press action, as well as operation parameters for left shifter 23 comprising advertise frequency 195, transmission power 196 and timeout 197 with depicted herein with a listed value of 900 seconds or 15 minutes past which left brake shifter 23 goes into sleep mode for maximum power savings.

Figure 15:
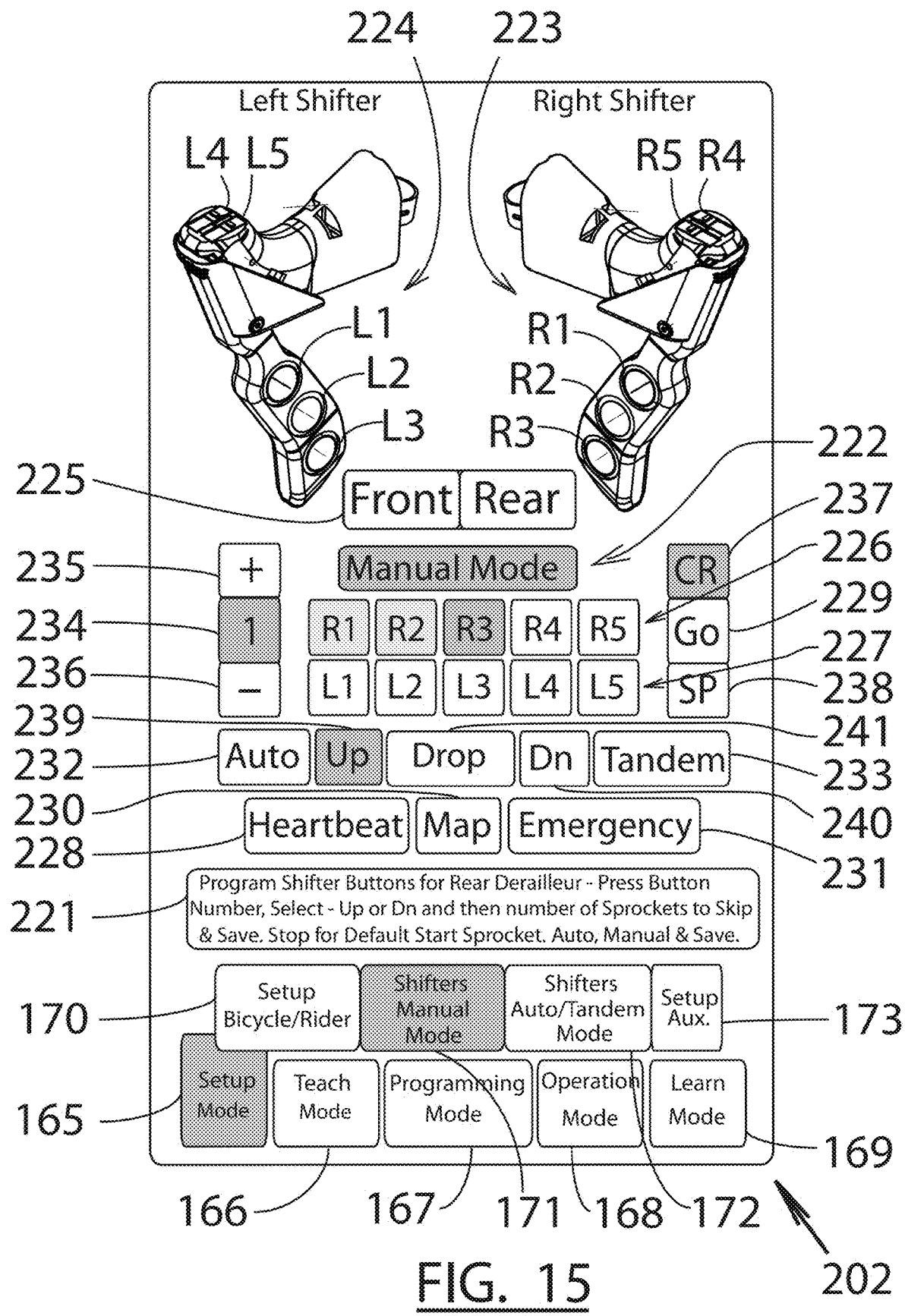
FIG. 15 is a view of the rider user interface for programming the right and left brake shifter microswitches and pushbuttons in Manual Mode of a bicycle making use of the preferred embodiment of the Electrical Derailleur Brake Shifter of the present invention.
Figure 16:
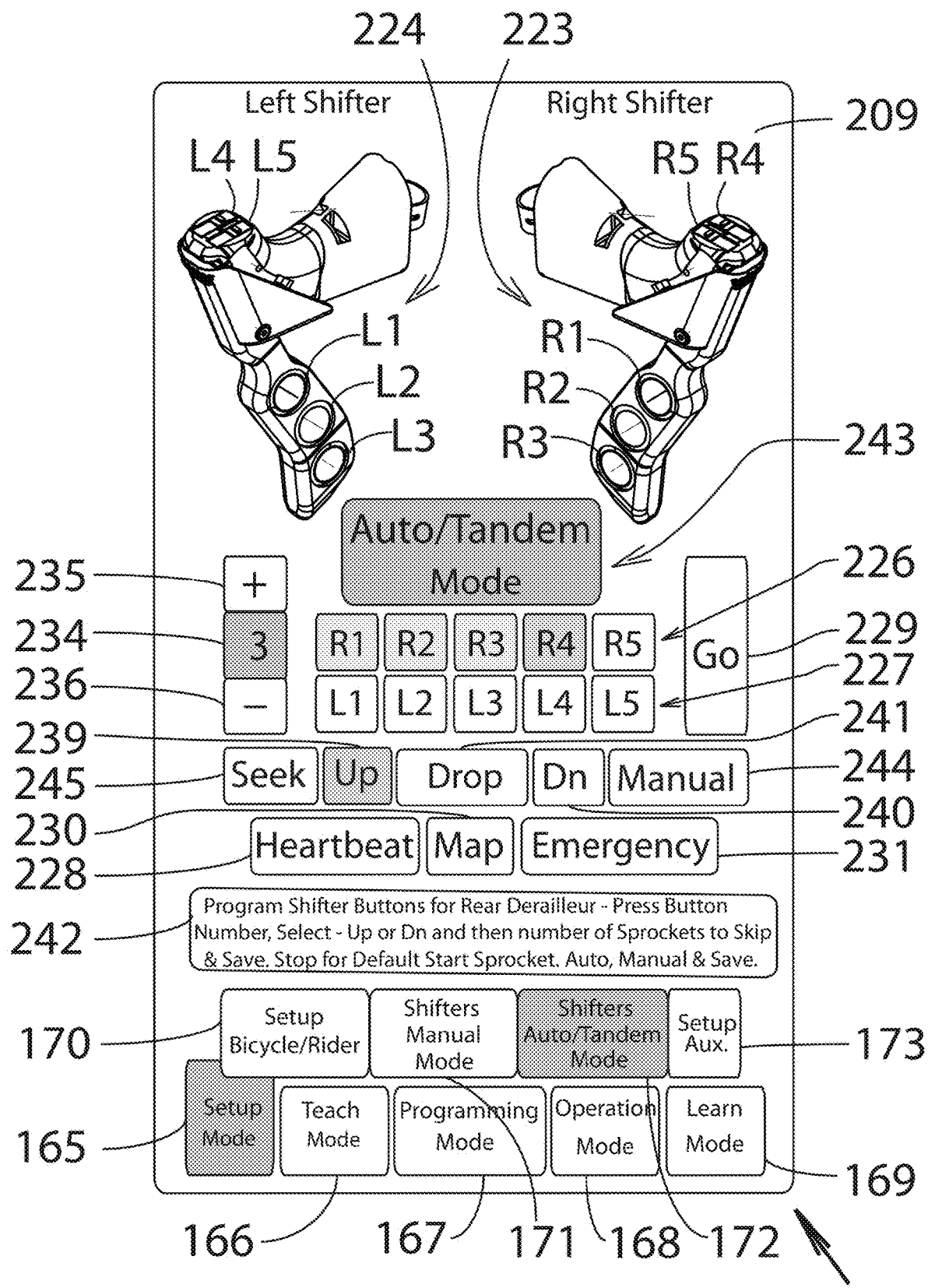
FIG. 16 is a view of the rider user interface for programming the right and left brake shifter microswitches and pushbuttons in Automatic/Tandem Mode of a bicycle making use of the preferred embodiment of the Electrical Derailleur Brake Shifter of the present invention.

Shifters Programming—FIGS. 15 & 16.

With reference to FIGS. 15 & 16, depicting rider user interface screens 202 and 203 for programming right brake shifter 22 and left brake shifter 23 of a bicycle making use of the preferred embodiment Electrical Derailleur Brake Shifter of the present invention, as can be seen, programming takes place in two distinct modes, each with own shifters functionality, namely Manual Mode where one brake shifter is dedicated to either the front or the rear derailleur with the other shifter to the other derailleur, and Tandem/Automatic mode where there exists no association of either shifters to either derailleur since they are being actuated in unison, with thereof programming taking place in another screen, where speed one, for example, is a combination of smallest chain ring with largest cassette sprocket, and speed two for example again, might be comprised with smallest chain ring with the second largest cassette sprocket, etc. and so on and so forth. In other words, rider will execute a shift operation that will typically involve actuation of both shifters with a single press of a brake shifter button with the only distinction between bicycle operation in automatic and in tandem modes being the use of the brake shifter by the rider to initiate a shift action in tandem mode while in Automatic Mode Application Program (APP) 43 of operator panel 20 conducts the shift action for each of front and rear derailleurs based on the programming for the defined speeds, acceleration, wind speed, seat force, heart rate, etc. . . . .

Additional functionality accessible through the shifters buttons includes buttons programmed to enter Manual Mode, Tandem Mode and Automatic Mode, a button programmed for "Stop Shift" where the rider is about to brake to a full stop and desires a certain start combination comprised of a combination of a chain ring and a cassette sprocket of choice for pedaling from a stop position, a button that will put a map on the user interface and possibly another button that will launch a cellphone Emergency call. For maximum flexibility no restrictions are imposed on which buttons in which mode triggers which desired functionality with the rider having the ability to assign the same button for a particular function through programming for the same functionality in both of screens 202 and 203 or alternately, the same button can be assigned different functions depending on which bicycle mode.

Shifters Manual Mode Programming—FIG. 15.

With reference to FIG. 15 depicting rider user interface screen 202 for programming right brake shifter 22 and left brake shifter 23 in Manual Mode for a bicycle making use of the preferred embodiment Electrical Derailleur Brake Shifter of the present invention, and with rider pressing Shifter Manual Mode button 171 which upon selection highlights in dark grey denoting activation of screen 202 comprising prompt window 221 serving to guide rider through thereof programming action, window 222 depicted in dark grey thereby confirming that rider has entered Manual Mode, right brake shifter icon 223 identifying right brake shifter microswitches 140 denoted R5 for outer microswitch, R4 for inner microswitch, and pushbuttons 153 consisting of upper brake lever pushbutton R1, center brake lever pushbutton R2 and bottom brake lever pushbutton R3, left brake shifter icon 224 identifying left brake shifter microswitches 140 denoted L5 for outer microswitch, L4 for inner microswitch, and left brake lever pushbuttons 153 consisting of upper brake lever pushbutton L1, center brake lever pushbutton L2 and bottom brake lever pushbutton L3, default setting for right handed riders with right brake shifter 22 being dedicated to rear derailleur 10 denoted by designation of window 225 with right pane labeled Rear, left brake shifter 23 being dedicated to front derailleur 14 with Front window 225 designation Front in left pane, and with a rider click on either window reversing the depicted right/left shifter to front/rear derailleur association for accommodation of left handed riders resulting in right brake shifter 22 being associated with front derailleur 14 and left brake shifter 23 being associated with rear derailleur 10, button row 226 for programming right shifter buttons R1 through R5, and button row 227 for programming left shifter buttons L1 through L5. Screen 202 additionally comprises Heartbeat button 228 serving to bring up screen depicting graph of rider heartbeat throughout trip while bicycle is in Operation Mode, programmed thereof by rider selecting any of buttons R1 through R5 in button row 226 or buttons L1 through L5 in button row 227 which when pressed turn to dark grey denoting thereof selection for programming with rider subsequently pressing Heartbeat button 228 for thereof assignment which also turns to dark grey denoting selection with rider subsequently pressing Go button 229 to finish programming. Map button 230 serving to display map depicting rider location, Emergency button 231 serving to initiate an emergency phone call, Auto button 232 serving to switch to Automatic Mode and Tandem button 233 serving to switch to Tandem Mode are programmed using the same procedure outlined for Heartbeat button 228. For maximum flexibility, no restriction is placed on duplication of button functionality, i.e., the same function can be arbitrarily programmed to however many buttons the rider desires. Additionally, rider is granted conventional shift ability of shifting either front derailleur 14 or rear derailleur 10 up or down by one speed through selection of desired R1 through R5 button from row 226 or L1 through L5 from row 227 for programming with rider subsequently ensuring that counter 234 is set to a count of one with thereof up adjustment through rider pressing + button 235 and down adjustment through rider pressing – button 236, rider then selects either front derailleur 14 through pressing chain ring CR button 237 or rear derailleur 10 by pressing cassette sprocket SP button 238, rider then presses Up button 239 or Down button 240 to denote desired action with Up button 239 denoting shifting to a higher speed comprising a larger chain ring or a smaller cassette sprocket and Down button 240 denoting shifting to a lower speed comprising a smaller chain ring or a larger cassette sprocket, rider finally presses Go button 229 to complete the programming sequence. Disclosed invention, through properly powered front derailleur 10 and rear derailleur 14 with ability to seek a desired sprocket in a single motion, additionally expands on conventional shift ability through enabling rider to skip sprockets, i.e., using the same procedure for programming shift up and shift down of cassette sprockets or chain rings but with thereof action equivalent to pressing the same button a number of times. Skip shift programming is achieved through update of counter 234 to a number of chain rings or sprockets to skip by pressing + button 235 and − button 236 however many times desired with each rider button press action thereof incrementing or decrementing counter 234 by one in order to bring Counter 234 to desired count, rider subsequently presses desired R1 through R5 or L1 through L5 button for selection to program, presses CR button 237 to assign action to front derailleur 14 or SP button 238 for rear derailleur 10 selection, presses Up button 239 or Down button 240 to select thereof desired action and then presses Go button 229 to program. Additionally, with each rider having a chain ring/cassette sprocket combination preference used to initiate motion from a stopping position, programming one button to grant rider ability to shift to desired bicycle start combination, hereby denoted Drop Shift, prior to applying the brakes to bring a bicycle to a full stop is achievable through pressing of Drop button 241 which upon selection turns to dark grey, rider subsequently presses any of desired button R1 through R5 from row 226 or L1 through L5 from row 227 which upon rider press turns to dark grey denoting selection for thereof programming, followed by rider pressing CR button 235 denoting which chain ring is choice for thereof programming and then using + button 235 and − button 236 to bring Counter 234 to desired chain ring position and then pressing Go button 229 to program selected chain ring, followed by rider pressing SP button 238 which upon selection turns dark grey, uses + button 235 and − button 236 to bring Counter 234 to desired cassette sprocket position and then presses Go button 229 a second time to finish thereof selected button programming. Last, upon programming each of right brake shifter buttons R1 through R5 and left brake shifter buttons L1 through L5, programmed button turns to light grey as depicted in screen 202 denoting that buttons R1 and R2 are already programmed with button R3 being in dark grey indicating it is being programmed for up shift as Up button 239 is in dark grey, of chain ring as CR button 237 is in dark grey, by one as indicated by counter 234 with thereof pending action being rider pressing Go button 229 to finish the programming sequence.

Shifter Automatic/Tandem Mode Programming—FIG. 16.

With reference to FIG. 16 depicting rider user interface screen 203 for programming right brake shifter 22 and left brake shifter 23 in Automatic/Tandem Mode for a bicycle making use of the preferred embodiment Electrical Derailleur Brake Shifter of the present invention, and with Automatic and Tandem modes bearing no association of right brake shifter 22 or left brake shifter 23 to either rear derailleur 10 and front derailleur 14, rather a combination thereof defined in Programming Mode for a desired number of speeds where each speed consists of a combination of chain rings and cassette sprockets, i.e. for example, speed 1 consisting of smallest chain ring and largest cassette sprocket, with speed 2 consisting of smallest chain ring and second largest cassette sprocket, and so on and so forth, until last speed, for example 27 is programmed to be a combination of largest chain ring and smallest cassette sprocket thereof, leading to each speed being designated with a single numeral. Upon rider pressing Shifter Automatic/Tandem Mode button 172 thereby causing it to highlight in dark grey thereby denoting activation of screen 203 comprising prompt window 242 serving to guide rider through thereof programming action, window 243 depicted in dark grey confirming that rider has entered Automatic/Tandem Mode, right brake shifter icon 223 identifying right brake shifter microswitches 140 and brake lever pushbuttons 153 as R1 through R5 with same designation thereof as screen 202, left brake shifter icon 224 identifying left brake shifter microswitches 140 and brake lever pushbuttons 153 as L1 through L5 also with same designation as screen 202, Heartbeat button 228, Map button 230 and Emergency button 231 programmed exactly as defined prior for screen 202 with rider making the selection of any of buttons R1 through R5 in button row 226 or buttons L1 through L5 in button row 227 which when pressed turn to dark grey denoting thereof selection for programming followed by rider pressing desired programming function button, Heartbeat button 228, Map button 229 or Emergency button 230 or alternately Manual mode button 244 for entering Manual Mode, for thereof assignment which also turns to dark grey denoting selection with rider finally pressing Go button 229 to finish programming. Additionally, rider is granted ability to shift bicycle speed up or down by one or more speeds, as front derailleur 10 and rear derailleur 14, just like indicated prior, have the ability to seek a desired sprocket in a single motion, through selection of desired R1 through R5 button from row 226 or L1 through L5 from row 227 to program which upon selection turn to dark grey and then with rider setting counter 234 to desired number of speeds to skip through adjustment of Counter 234 to proper numeral by pressing+ button 235 and − button 236 however many times as necessary, followed by rider pressing Up button 239 or Down button 240 to denote desired action followed by pressing Go button 229 for thereof programming. Additionally, rider is able to program start speed from a stopping position using same procedure outlined prior for Manual Mode by pressing Drop button 241 which upon selection turns to dark grey with rider subsequently selecting button to program from row 226 or row 227 denoting right brake shifter R1 through R5 and left brake shifter buttons L1 through L5 respectively leading to button selected for programming turning to dark grey with rider subsequently using + button 235 and − button 236 to bring Counter 234 to desired start speed and finally pressing Go button 229 to program. Last, disclosed invention additionally grants the rider the ability to seek a certain speed through pressing of Seek button 245 which upon selection turns to dark grey, rider subsequently presses any of desired button R1 through R5 from row 226 or L1 through L5 from row 227 which upon rider press turns to dark grey denoting + button 235 and − button 236 however many times as necessary to bring Counter 234 to desired Seek speed and then pressing Go button 229 to program. Finally, upon programming each of right brake shifter buttons R1 through R5 and left brake shifter buttons L1 through L5 turns to light grey as depicted in screen 203 denoting that buttons R1, R2 and R3 are already programmed with button R4 being in dark grey indicating it is being programmed for up shift as Up button 239 is in dark grey by three speeds as counter 234 is set to 3 with only pending action thereof is rider pressing Go button 229 to finish depicted programming sequence.

The claims of the electrical derailleur Controller of the present invention are as follows:
1. An electrical derailleur controller comprising,
    a) a housing including a first cavity for a circuit board with population thereof including a processor with connections to an inertial sensor, an environmental sensor, a first dry contact relay, a second dry contact relay and an LCD display,
    b) said first cavity of said housing further including a cover with thereof attachment through a sealing gasket,
    c) said housing further including a second cavity for a battery and a cam cover fitted through an o'ring captive thereof between said cam cover and said housing, d) a cam action clamp pivotally secured to said housing including a cam fitted for a sealing compression of said o'ring through engagement with cams of said cam cover,
e) said housing further including a third cavity for said LCD display sealed thereto by a first bonded cover,
f) said housing further including a fourth cavity for said environmental sensor sealed thereto by a second bonded cover,
g) said processor further including a Bluetooth Low Energy (BLE) wireless communication transceiver,
h) said first dry contact relay including a first actuation coil with a first connection to thereof collector terminal of a first NPN transistor and a second connection to a positive terminal of said battery,
i) said second dry contact relay including a second actuation coil with a first connection to thereof collector terminal of a second NPN transistor and a second connection to said positive terminal of said battery
j) said first NPN transistor further including a connection from thereof emitter terminal to a negative terminal of said battery,
k) said second NPN transistor further including a connection from thereof emitter terminal to said negative terminal of said battery,
l) said first NPN transistor further including a connection from thereof base terminal to a first output pin of said processor through a first current limiting resistor,
m) said second NPN transistor further including a connection from thereof base terminal to a second output pin of said processor through a second current limiting resistor,
n) said first dry contact relay further including a first normally open dry contact with a first connection from thereof first terminal to a ground terminal of a remote control (RC) servo of an electrical rear derailleur and a second connection from thereof second terminal to said ground terminal of said battery,
o) said second dry contact relay further including a second normally open dry contact with a first connection from thereof first terminal to a ground terminal of a remote control (RC) servo of an electrical front derailleur and a second connection from thereof second terminal to said ground terminal of said battery,
p) said processor further including a firmware for generation and transmission of a first pulse width modulation (PWM) signal through a first pulse width modulation (PWM) signal output pin and a second pulse width modulation (PWM) signal through a second pulse width modulation (PWM) output pin,
q) said first pulse width modulation (PWM) output pin of said processor further including a connection to a thereof emitter terminal of a third NPN transistor,
r) said second pulse width modulation (PWM) output pin of said processor further including a connection to a thereof emitter terminal of a fourth NPN transistor,
s) said third NPN transistor further including a connection from thereof collector terminal to a pulse width modulation (PWM) signal input terminal of said remote control (RC) servo of said electrical rear derailleur,
t) said fourth NPN transistor further including a connection from thereof collector terminal to a pulse width modulation (PWM) signal input terminal of said remote control (RC) servo of said electrical front derailleur,
u) said third NPN transistor and said fourth NPN transistor further including a joint connection from their base terminals to a biasing output pin of said processor through a third current limiting resistor,
v) an operator panel including an application program (APP) for control of a touchscreen display for entry of shift commands of a rider and a Bluetooth Low Energy (BLE) wireless communication transceiver,
w) said Bluetooth Low Energy (BLE) wireless communication transceiver of said operator panel further including a wireless communication connection to said Bluetooth Low Energy (BLE) wireless communication transceiver of said controller for thereof relay of said shift commands of said rider,
x) said battery further including a first connection from said positive terminal to thereof positive terminal of said remote control (RC) servo of said electrical rear derailleur and a second connection from said positive terminal to thereof positive terminal of said remote control (RC) servo of said electrical front derailleur,
y) said processor further including connections to a battery voltage dividing circuit, a battery low LED, a processor status pushbutton and an I2C bus with connections to said environmental sensor, said inertial sensor, and said LCD display, and
z) said processor further including an input pin for thereof connection of a cadence sensor of a bicycle through a current limiting resistor, whereby said processor receives said shift commands of said rider from said touchscreen display of said operator panel through thereof said Bluetooth Low Energy (BLE) wireless communication transceiver, monitors a signal from said cadence sensor and accordingly generates through said firmware said first pulse width modulation (PWM) signal for thereof transmission through said pulse width modulation (PWM) signal input terminal of said remote control (RC) servo of said electrical rear derailleur and said second pulse width modulation (PWM) signal for thereof transmission through said pulse width modulation (PWM) signal input terminal of said remote control (RC) servo of said electrical front derailleur and with thereof transmission enabled through energization of said joint connection of said base terminals of said third NPN transistor and said fourth NPN transistor through energization of said biasing output pin of said processor, and with connection of said ground terminal of said battery to said ground terminal of said remote control (RC) servo of said electrical rear derailleur enabled through closure of said first normally open dry contact through energization of said first actuation coil of said first dry contact relay through energization of said base terminal of said first NPN transistor through energization of said first output pin of said processor and with connection of said ground terminal of said battery to said ground terminal of said remote control (RC) servo of said electrical front derailleur enabled through closure of said second normally open dry contact through energization of said second actuation coil of said second dry contact relay through energization of said base terminal of said second NPN transistor through energization of said second output pin of said processor resulting in thereof actuation of either of said electrical rear derailleur or said electrical front derailleur of both per said shift command of said rider.

2. The electrical derailleur controller of claim 1 wherein said Bluetooth Low Energy (BLE) wireless communication transceiver of said processor makes use of Bluetooth Low Energy (BLE) Ibeacon beacon wireless transmission protocol for advertising thereof position.

3. The electrical derailleur controller of claim 1 wherein said Bluetooth Low Energy (BLE) wireless communication transceiver of said operator panel makes use of the Nordic Bluetooth Low Energy (BLE) UUID service 6E400001-B5A3-F393-E0A9-E50E24DCCA9E for wireless connection with said Bluetooth Low Energy (BLE) wireless communication transceiver of said processor.

4. The electrical derailleur controller of claim 1 wherein said Bluetooth Low Energy (BLE) wireless communication transceiver of said processor makes use of the Nordic Bluetooth Low Energy (BLE) UUID service 6E400002-B5A3-F393-E0A9-E50E24DCCA9E for receipt of said shift commands of said rider.

5. The electrical derailleur controller of claim 1 wherein said Bluetooth Low Energy (BLE) wireless communication transceiver of said processor makes use of the Nordic Bluetooth Low Energy (BLE) UUID service 6E400003-B5A3-F393-E0A9-E50E24DCCA9E for regular notification of data from said environmental sensor, said inertial sensor and said cadence sensor to said Bluetooth Low Energy (BLE) wireless communication transceiver of said operator panel.

6. The electrical derailleur controller of claim 1 wherein said Bluetooth Low Energy (BLE) wireless communication transceiver of said processor makes use of the Nordic Bluetooth Low Energy (BLE) UUID service 6E400003-B5A3-F393-E0A9-E50E24DCCA9E for regular notification of charge of said battery to said Bluetooth Low Energy (BLE) wireless communication transceiver of said operator panel through measurement of voltage of said battery voltage dividing circuit.

7. The electrical derailleur controller of claim 1 wherein said processor monitors status of said battery through measurement of said voltage of said voltage dividing circuit and flashes said battery low LED upon said voltage falling below a predefined threshold.

8. The electrical derailleur controller of claim 1 wherein said LCD display prompts said rider with status and diagnostic data of said processor upon presses of said processor status pushbutton.

9. The electrical derailleur controller of claim 1 wherein said housing further includes a quick charge connector for said battery.

10. An electrical derailleur controller comprising,
a) a housing including a first cavity for a circuit board with population thereof including a processor with connections to an inertial sensor, an environmental sensor, a first dry contact relay, a second dry contact relay and an LCD display,
b) said first cavity of said housing further including a cover with thereof attachment through a sealing gasket,
c) said housing further including a second cavity for a battery and a cam cover fitted through an o'ring captive thereof between said cam cover and said housing,
d) a cam action clamp pivotally secured to said housing including a cam fitted for a sealing compression of said o'ring through engagement with cams of said cam cover,
e) said housing further including a third cavity for said LCD display sealed thereto by a first bonded cover,
f) said housing further including a fourth cavity for said environmental sensor sealed thereto by a second bonded cover,
g) said processor further including a Bluetooth Low Energy (BLE) wireless communication transceiver,
h) said processor further including a firmware for generation of a first pulse width modulation (PWM) signal through a first pulse width modulation (PWM) signal output pin and a second pulse width modulation (PWM) signal through a second pulse width modulation (PWM) output pin,
i) said first pulse width modulation (PWM) output pin of said processor further including a connection to a pulse width modulation (PWM) signal input terminal of a remote control (RC) servo of an electrical rear derailleur,
j) said second pulse width modulation (PWM) output pin of said processor further including a connection to a pulse width modulation (PWM) signal input terminal of a remote control (RC) servo of an electrical front derailleur,
k) said battery further including a first connection from thereof negative terminal to thereof negative terminal of said remote control (RC) servo of said electrical rear derailleur and a second connection from said negative terminal to thereof negative terminal of said remote control (RC) servo of said electrical front derailleur,
l) said battery further including a first connection from thereof positive terminal to thereof positive terminal of said remote control (RC) servo of said electrical rear derailleur and a second connection from said positive terminal to thereof positive terminal of said remote control (RC) servo of said electrical front derailleur,
m) an operator panel including an application program (APP) for control of a touchscreen display for entry of shift commands of a rider and a Bluetooth Low Energy (BLE) wireless communication transceiver,
n) said Bluetooth Low Energy (BLE) wireless communication transceiver of said operator panel further including a wireless communication connection to said Bluetooth Low Energy (BLE) wireless communication transceiver of said controller for thereof relay of said shift commands of said rider,
o) said processor further including connections to a battery voltage dividing circuit, a battery low LED, a processor status pushbutton and an I2C bus with connections to said environmental sensor, said inertial sensor, and said LCD display, and
p) said processor further including an input pin for thereof connection of a cadence sensor of a bicycle through a current limiting resistor,
whereby said processor of said controller receives said shift commands of said rider from said touchscreen display of said operator panel through said thereof Bluetooth Low Energy (BLE) wireless communication transceiver, monitors a signal from said cadence sensor and accordingly generates said first pulse width modulation (PWM) signal and said second pulse width modulation (PWM) signal through said firmware with thereof immediate transmission to said pulse width modulation (PWM) input pin of said electrical rear derailleur and said pulse width modulation (PWM) input pin of said front derailleur resulting in actuation of either of said electrical rear derailleur or said electrical front derailleur or both per said shift command of said rider.

11. The electrical derailleur controller of claim 10 wherein said Bluetooth Low Energy (BLE) wireless communication transceiver of said processor makes use of Bluetooth Low Energy (BLE) Ibeacon beacon wireless transmission protocol for advertising thereof position.

12. The electrical derailleur controller of claim 10 wherein said Bluetooth Low Energy (BLE) wireless communication transceiver of said operator panel makes use of the Nordic Bluetooth Low Energy (BLE) UUID service 6E400001-B5A3-F393-E0A9-E50E24DCCA9E for wireless connection with said Bluetooth Low Energy (BLE) wireless communication transceiver of said processor.

13. The electrical derailleur controller of claim 10 wherein said Bluetooth Low Energy (BLE) wireless communication transceiver of said processor makes use of the Nordic Bluetooth Low Energy (BLE) UUID service 6E400002-B5A3-F393-E0A9-E50E24DCCA9E for receipt of said shift commands of said rider.

14. The electrical derailleur controller of claim 10 wherein said Bluetooth Low Energy (BLE) wireless communication transceiver of said processor makes use of the Nordic Bluetooth Low Energy (BLE) UUID service 6E400003-B5A3-F393-E0A9-E50E24DCCA9E for regular notification of data from said environmental sensor, said inertial sensor and said cadence sensor to said Bluetooth Low Energy (BLE) wireless communication transceiver of said operator panel.

15. The electrical derailleur controller of claim 10 wherein said Bluetooth Low Energy (BLE) wireless communication transceiver of said processor makes use of the Nordic Bluetooth Low Energy (BLE) UUID service 6E400003-B5A3-F393-E0A9-E50E24DCCA9E for regular notification of charge of said battery to said Bluetooth Low Energy (BLE) wireless communication transceiver of said operator panel through measurement of voltage of said battery voltage dividing circuit.

16. The electrical derailleur controller of claim 10 wherein said processor monitors status of said battery through measurement of said voltage of said voltage dividing circuit and flashes said battery low LED upon said voltage falling below a predefined threshold.

17. The electrical derailleur controller of claim 10 wherein said LCD display prompts said rider with status and diagnostic data of said processor upon presses of said processor status pushbutton.

18. The process for control of operation of a bicycle electrical rear derailleur and electrical front derailleur comprising,
   a) providing a housing including a first cavity for a circuit board with population thereof including a processor with connections to an inertial sensor, an environmental sensor, a first dry contact relay, a second dry contact relay and an LCD display,
   b) providing said first cavity of said housing with a cover with thereof attachment through a sealing gasket,
   c) providing said housing with a second cavity for a battery and a cam cover fitted through an o'ring captive thereof between said cam cover and said housing,
   d) providing a cam action clamp pivotally secured to said housing including a cam fitted for a sealing compression of said o'ring through engagement with cams of said cam cover,
   e) providing said housing with a third cavity for said LCD display sealed thereto by a first bonded cover,
   f) providing said housing with a fourth cavity for said environmental sensor sealed thereto by a second bonded cover,
   g) providing said processor with a Bluetooth Low Energy (BLE) wireless communication transceiver,
   h) providing said processor with a firmware for generation of a first pulse width modulation (PWM) signal through a first pulse width modulation (PWM) signal output pin and a second pulse width modulation (PWM) signal through a second pulse width modulation (PWM) output pin,
   i) providing said first pulse width modulation (PWM) output pin of said processor with a connection to a pulse width modulation (PWM) signal input terminal of a remote control (RC) servo of an electrical rear derailleur,
   j) providing said second pulse width modulation (PWM) output pin of said processor with a connection to a pulse width modulation (PWM) signal input terminal of a remote control (RC) servo of an electrical front derailleur,
   k) providing said battery with a first connection from thereof negative terminal to thereof negative terminal of said remote control (RC) servo of said electrical rear derailleur and a second connection from said negative terminal to thereof negative terminal of said remote control (RC) servo of said electrical front derailleur,
   l) providing said battery with a first connection from thereof positive terminal to thereof positive terminal of said remote control (RC) servo of said electrical rear derailleur and a second connection from said positive terminal to thereof positive terminal of said remote control (RC) servo of said electrical front derailleur,
   m) providing an operator panel including an application program (APP) for control of a touchscreen display for entry of shift commands of a rider and a Bluetooth Low Energy (BLE) wireless communication transceiver,
   n) providing said Bluetooth Low Energy (BLE) wireless communication transceiver of said operator panel with a wireless communication connection to said Bluetooth Low Energy (BLE) wireless communication transceiver of said controller for thereof relay of said shift commands of said rider,
   o) providing said processor with connections to a battery voltage dividing circuit, a battery low LED, a processor status pushbutton and an I2C bus with connections to said environmental sensor, said inertial sensor, and said LCD display, and
   p) providing said processor with an input pin for thereof connection of a cadence sensor of a bicycle through a current limiting resistor,
   whereby said processor of said controller receives said shift commands of said rider from said touchscreen display of said operator panel through said thereof Bluetooth Low Energy (BLE) wireless communication transceiver, monitors a signal from said cadence sensor and accordingly generates said first pulse width modulation (PWM) signal and said second pulse width modulation (PWM) signal through said firmware with thereof immediate transmission to said pulse width modulation (PWM) input pin of said electrical rear derailleur and said pulse width modulation (PWM) input pin of said front derailleur resulting in actuation of either of said electrical rear derailleur or said electrical front derailleur or both per said shift command of said rider.

19. The process for control of operation of a bicycle electrical rear derailleur and electrical front derailleur of claim 18 wherein said Bluetooth Low Energy (BLE) wireless communication transceiver of said processor makes use of Bluetooth Low Energy (BLE) Ibeacon beacon wireless transmission protocol for advertising thereof position.

20. The process for control of operation of a bicycle electrical rear derailleur and electrical front derailleur of claim 18 wherein said Bluetooth Low Energy (BLE) wireless communication transceiver of said operator panel makes use of the Nordic Bluetooth Low Energy (BLE) UUID service 6E400001-B5A3-F393-E0A9-E50E24DCCA9E for wireless connection with said Bluetooth Low Energy (BLE) wireless communication transceiver of said processor.

21. The process for control of operation of a bicycle electrical rear derailleur and electrical front derailleur of claim 18 wherein said Bluetooth Low Energy (BLE) wireless communication transceiver of said processor makes use of the Nordic Bluetooth Low Energy (BLE) UUID service 6E400002-B5A3-F393-E0A9-E50E24DCCA9E for receipt of said shift commands of said rider.

22. The process for control of operation of a bicycle electrical rear derailleur and electrical front derailleur of claim 18 wherein said Bluetooth Low Energy (BLE) wireless communication transceiver of said processor makes use of the Nordic Bluetooth Low Energy (BLE) UUID service 6E400003-B5A3-F393-E0A9-E50E24DCCA9E for regular notification of data from said environmental sensor, said inertial sensor and said cadence sensor to said Bluetooth Low Energy (BLE) wireless communication transceiver of said operator panel.

* * * * *